United States Patent
Zerfos et al.

(10) Patent No.: US 8,307,414 B2
(45) Date of Patent: Nov. 6, 2012

(54) METHOD AND SYSTEM FOR DISTRIBUTED, LOCALIZED AUTHENTICATION IN THE FRAMEWORK OF 802.11

(75) Inventors: Petros Zerfos, New York, NY (US); Jatinder Pal Singh, Mountain View, CA (US); Marcin Solarski, Berlin (DE); Pablo Vidales, Berlin (DE); Nathanael Thompson, Champaign, IL (US); Haiyun Luo, San Jose, CA (US)

(73) Assignees: Deutsche Telekom AG, Bonn (DE); Board of Trustees of the University of Illinois, Urbana, IL (US)

( * ) Notice: Subject to any disclaimer, the term of this patent is extended or adjusted under 35 U.S.C. 154(b) by 709 days.

(21) Appl. No.: 12/205,359

(22) Filed: Sep. 5, 2008

(65) Prior Publication Data

US 2009/0187983 A1    Jul. 23, 2009

Related U.S. Application Data

(60) Provisional application No. 60/970,595, filed on Sep. 7, 2007.

(51) Int. Cl.
*G06F 7/04* (2006.01)

(52) U.S. Cl. .......................................... 726/10; 713/158
(58) Field of Classification Search ...................... 726/10
See application file for complete search history.

(56) References Cited

U.S. PATENT DOCUMENTS

| | | | |
|---|---|---|---|
| 7,430,606 B1 * | 9/2008 | Meandzija et al. | 709/229 |
| 2004/0168054 A1 | 8/2004 | Halasz et al. | |
| 2005/0053045 A1 * | 3/2005 | Chmora et al. | 370/338 |
| 2005/0138351 A1 | 6/2005 | Lee et al. | |
| 2005/0154909 A1 * | 7/2005 | Zhang et al. | 713/200 |
| 2005/0228998 A1 * | 10/2005 | Chan et al. | 713/175 |
| 2006/0039305 A1 | 2/2006 | Thawani et al. | |
| 2006/0143458 A1 | 6/2006 | Tie et al. | |
| 2007/0036110 A1 | 2/2007 | Preguica | |
| 2007/0100701 A1 * | 5/2007 | Boccon-Gibod et al. | 705/21 |

FOREIGN PATENT DOCUMENTS

WO    WO 2005065134 A2    7/2005

OTHER PUBLICATIONS

Morogan et al. "Certificate Management in Ad-hoc Networks", International Symposium on Applications and the Internet, 2003, pp. 1-5.*

Boss et al. "Routing with Guaranteed Delivery in ad-hoc Wireless Networks", Wireless Networks, 2001, pp. 1-9.*

(Continued)

*Primary Examiner* — Shewaye Gelagay

(74) *Attorney, Agent, or Firm* — Leydig, Voit & Mayer, Ltd.

(57) ABSTRACT

A method for controlling Internet access of a mobile device by using a communication system having a number of access points includes the steps of performing a certificate-based authentication between an authentication access point and a mobile device seeking access to the Internet; transmitting a certificate from the mobile device to the authentication access point; verifying the certificate by the authentication access point; determining whether the authenticating mobile device's certificate has been revoked prior to the expiration of its lifetime; and granting the authenticating mobile device access to the Internet, if the certificate has been verified successfully and not revoked prior to the expiration of its lifetime.

25 Claims, 7 Drawing Sheets

OTHER PUBLICATIONS

Solarski, M: "An Experimental Evaluation of Urban Networking using IEEE 802.11 Technology", Proc. 1st IEEE International Workshop on Operator-Assisted (Wireless Mesh) Community Networks (OpComm 2006), Sep. 2006, 10 pages.

Jatinder Pal Singh, "Authentication on the Edge: Distributed Authentication for a Global Open Wi-Fi Network" [Online] http://www.standford.edu/'jatinder/academic/ publications/year/2007/mobilcom2007, Jul. 19, 2007, pp. 1-12.

Husseiki, R., "Distributed Authentication and Key management in Wireless Mesh Networks," Matser's Thesis [Online], http://dsv.su.se/eb/seclab/pages/pdf-files/2006-x-415.pdf, Apr. 2006, Stockholm, Sweden, pp. 1-86.

Marcodomenico, Aime et al., "Decentralised Access Control in 802.11 Networks," Communications and Multimedia Security Lecture Notes in Computer Sicnece; LNCS, Springer, Berlin, Germany, vol. 3677, Jan. 1, 2005, pp. 180-190.

Lee, Insun et al., Efficient Distributed Authentication Method with Local Proxy for Wireless Networks, Wireless Communications and Networking Conference, 2007.WCNC 2007. IEE E, IEEE, PI, Mar. 1, 2007, pp. 3553-3557.

Nigusse, Girma Enideg, "Evaluating Public Key Certificate Revocation Schemes: Towards Conceptually Versatile Revocation Scheme," Master's Thesis [Online] http://dsv.su.se/en/seclab/pages/pdf-filed/2007-x-517.pdf, Aug. 2007, pp. 1-85.

Thompson, N. A. et al., "Authenticayion on the Edge: Distributed Authentication for a Global Open Wi-Fi Network," Proceedings of the 13th Annual ACM International Conference on Mobile Computing and Networking, Sep. 9, 2007-Sep. 13, 2007, Montreal, Canada, pp. 334-337.

Jun. 2006 bandwidth report. http://www.websiteoptimization.com/bw/0606/.

Wi-Fi surpasses ethernet for home networking. http://www.parksassociates.com/press/pressreleases/2005/gd12.html.

B. Adoba and D. Simon. RFC 2716: PPP EAP TLS authentication protocol, Network Working Group, Oct. 1999, 23 pages.

M. Bina and G. Giaglis. Emerging issues in researching community-based wlans. Journal of Computer Information Systems, vol. 46, Issue 1, Fall 2005, pp. 9-16.

P. Bose, P. Morin, L. Stojmenovic, and J. Urrutia. Routing with guaranteed delivery in ad hoc wireless networks. Wireless Networks, 7(6) :609-616, 2001.

M. Castro, P. Druschel, A. Ganesh, A. Rowstron, and D. S. Wallach. Secure routing for structured peer-to-peer overlay networks. SIGOPS Oper. Syst. Rev., pp. 299-314, 2002.

R. Chakravorty, S. Agarwal, S. Banerjee, and I. Pratt. Mob: a mobile bazaar for wide-area wireless services. In Proceedings of ACM MobiCom '05, pp. 228-242, 2005.

J. R. Douceur. The sybil attack. In Proceedings of International Workshop on Peer-to-Peer Systems, Microsoft Research, 2002, 10 pages. www.research.microsoft.com/~johndo.

E. Efstathiou, P. Frangoudis, and G. Polyzos.Stimulating participation in wireless community networks. In Proceedings of IEEE INFOCOM, 2006, 13 pages.

H. Frey and I. Stojmenovic. On delivery guarantees of face and combined greedy-face routing in ad hoc and sensor networks. In MobiCom '06: Proceedings of the 12th annual international conference on Mobile computing and networking, 2006, p. 390-401.

J. Gao, L. J. Guibas, J. Hershberger, L. Zhang, and A.Zhu. Geometric spanner for routing in mobile networks. In MobiHoc '01: Proceedings of the 2nd ACM international symposium on Mobile ad hoc networking & computing, 2001, p. 45-55.

I. Gupta, K. Birman, P. Linga, A. Demers, and R. van Renesse. Kelips: Building an efficient and stable P2P DHT through increased memory and background overhead. In Proceedings of the 2nd International Workshop on Peer-to Peer Systems (IPTPS '03), 2003, p. 1-6.

M. Kaminsky, G. Savvides, D. Mazieres, and M. F.Kaashoek. Decentralized user authentication in a global file system. MIT Coputer Science and Artificial Intelligence Laboratory; In Proceedings of ACM SOSP, 2003, 14 pages.

B. Karp and H. T. Kung. GPSR: Greedy perimeter stateless routing for wireless networks. In Proceedings of ACM MobiCom, 2000, 12 pages.

J. Kleinberg. The small-world phenomenon: an algorithm perspective. In STOC '00: Proceedings of the thirty second annual ACM symposium on Theory of computing, pp. 163-170, New York, NY, USA, 2000. ACM Press.

F. Kuhn, R. Wattenhofer, and A. Zollinger. Worst-case optimal and average-case efficient geometric ad-hoc routing. In MobiHoc '03: Proceedings of the 4th ACM international symposium on Mobile ad hoc networking & computing, 2003, p. 267-278.

B. Leong, S. Mitra, and B. Liskov. Path vector face routing: Geographic routing with local face information. MIT Computer Science and Artificial Intelligence Laboratory. In Proceedings of ICNP 2005, 12 pages.

S. Marti, P. Ganesan, and H. Garcia-Molina. Sprout: P2p routing with social networks. In Proceedings of First International Workshop on Peer-to-Peer and Databases (P2PDB 2004), Mar. 1, 2004, p. 1-19.

S. Micali. Efficient certificate revocation. In Technical Memo MIT/LCS/TM-542b, 1996, Laboratory for computer Science, Massachusets Institute of TEchnology, Cambridge, p. 1-10.

S. Ratnasamy, P. Francis, M. Handley, R. Karp, and S.Schenker. A scalable content-addressable network. In SIGCOMM '01: Proceedings of the 2001 conference on Applications, technologies, architectures, and protocols for computer communications, 2001, p. 161-172.

A. Rowstron and P. Druschel. Pastry: Scalable, decentralized object location and routing for largescale peer-to-peer systems. In Proceedings of Conference on Distributed Systems Platforms, Heidelberg, 2001, 22 pages.

I. Stoica, R. Morris, D. Liben-Nowell, D. R. Karger, M. F. Kaashoek, F. Dabek, and H. Balakrishnan. Chord: A scalable peer-to-peer lookup protocol for Internet applications. IEEE/ACM Transactions on Networking, 11(1) :17-32, Feb. 2003, p. 17-32.

N. Thompson, G. He, and H. Luo. Flow scheduling for end-host multihoming. In Proceedings of IEEE INFOCOM, Dept. of Computer Science, Univ. of Illinois, 2006, 12 pages.

H. Yang, H. Luo, Y. Yi, S. Lu, and L. Zhang. HOURS: Achieving DoS resilience in an open service hierarchy. Computer Science Dept, Univ. of California; In Proceedings of DSN, 2004, 10 pages.

L. Yang, P. Zerfos, and E. Sadot. Architecture taxonomy for control and provisioning of wireless access points (CAPWAP). UCLA, IETF Request for Comments (RFC4118), Jun. 2005, 39 pages.

Adoba B., "Virtual Access Points", IEEE P802.11 Wireless LANs; May 22, 2003, 13 pages.

Fon homepage, http.//www.fon.com/, accessed on Nov. 18, 2008 and Jul. 22. 2009, pp. 1-2.

Boingo homepage, http:www.boingo.com, accessed on Nov. 18, 2008, pp. 1-2.

T-Mobile Hotspot homepage, http://www.hotspot.t-mobile.com/, accessed on Nov. 18, 2008, pp. 1-2.

* cited by examiner

METHOD AND SYSTEM FOR DISTRIBUTED, LOCALIZED AUTHENTICATION IN THE FRAMEWORK OF 802.11

CLAIM OF PRIORITY

This patent application claims the benefit of priority, under 35 U.S.C. §119, of U.S. Provisional Patent Application Ser. No. 60/970,595, filed Sep. 7, 2007, entitled "METHOD AND SYSTEM FOR DISTRIBUTED, LOCALIZED AUTHENTICATION IN THE FRAMEWORK OF 802.11" the entire disclosure of which is incorporated herein by reference.

FIELD

The present invention pertains in general to a method and a system for distributed and localised authentication between a mobile device and an access point of a WLAN, e.g. an 802.11i-based WLAN. In particular, the present invention is directed to a method and a communication system for controlling access of a mobile device to the Internet using an access point.

BACKGROUND

Ubiquitous Internet access at high speed and low cost has been a long-standing vision for years, attracting major efforts from both academia and industry. As shown in recent studies (e.g. June 2006 bandwidth report published on the webpage websiteoptimization.com/bw/0606/or Wi-Fi Surpasses Ethernet for Home Networking published on the webpage parksassociates.com/press/press releases/2005/gd12), indoor Internet connectivity is becoming pervasive in the U.S. as a result of the steady growth of broadband penetration to the home and the proliferation of 802.11-based wireless local area networks (WLANs) deployed in households and other popular indoor locations. On the other hand, outdoor coverage for broadband Internet access is seriously lagging behind despite the explosion of wireless network technologies and deployments over the last decade.

One major challenge is to control the access of a mobile device to the Internet.

There are two predominant approaches currently in use to manage access to wireless networks: captive portals and LAN port authentication schemes. Captive ports are deployed in hotspots and several open Wi-Fi projects. A captive portal is a firewall application which restricts all traffic going from the client to the Internet until the user has authenticated through a custom webpage (e.g. chillispot.org/, dev.wifidog.org/). Since captive portals are password-based they need the cooperation by the user. Moreover, captive portals provide no wireless encryption between a mobile device and an access point and suffer from long authentication delays when communicating to a central server.

An existing LAN port authentication schemes is shown in FIG. 1. FIG. 1 depicts an exemplary wireless local area network designated by reference number 60. The WLAN 60 connects an authentication server 40 and an access point 30 which operates as an authenticator to provide access to the Internet 50. The authentication server 40 can be implemented for example as a RADIUS (Remote Authentication Dial-in User Service Protocol) server or a MS Active Directory server in the case PKI-based EAP modes such as EAP-TLS and EAP-TTLS are employed. A mobile device 10 is located in the coverage area (wireless cell) 20 of the access point and it tries to get access to the Internet 50. For example the WPA and the next 802.11i standards are used, which are based on the IEEE 802.1x framework and the extensible authentication protocol (EAP) and are well known to a person skilled in the art. The EAP scheme provides wireless encryption and supports a wide range of different authentication methods. A supplicant is implemented in the mobile device 10 and is the client side access control entity. It associates to an authenticator located in the access point 30 such as an Ethernet switch or Wi-Fi access point. The supplicant is authenticated through a closed port on the access point 30 against the authentication server 40. If the authentication is successful the authentication server 40 signals the authenticator to open the port to allow authorized traffic from the supplicant, e.g. access to other servers in the WLAN 60 or Internet 50. Although the standardized EAP methods work well in enterprise networks, they are not design for a global-scale Internet access infrastructure based on privately owned wireless Internet access points. These access points are, for example, installed in Wi-Fi networks of private persons or small enterprises. The existing methods are not designed to scale to the size of such a global-scale Internet access infrastructure. Intended for deployment in enterprise LANs with hundreds or maybe thousands of clients, the authentication server will be seriously challenged with potentially millions of active clients.

In addition, the existing authentication schemes are designed for LAN authentication so that all entities are deployed in the local enterprise network or even the same LAN segment. A global-scale Internet access infrastructure acts as an overlay operator or an overlay wireless Internet Service Provider (ISP) that is collectively owned by its actual users. Network management systems currently used in enterprise access network deployments perform centralized authentication in connection with an authentication server. A centralized authentication, however, is vulnerable to general Internet outages and distributed DoS attacks. Such a network management system is described for example by L. Yang et al. in the article "Architecture taxonomy for control and provisioning of wireless access points (CAPWAP). IETF Request For Comments (RFC4118), June 2005. The access points should be able to operate reliably and autonomously, even when access to network functions provided by a back-end management system is temporarily unavailable or inaccessible.

In the US patent application with publication number US2006/0143458 A1, Jun. 29, 2006, a method for secure access of mobile stations to a WLAN via certificate-based authentication is discussed. In the proposed method, a mobile terminal (MT) sends its certificate to the access point along with an authentication request message. The access point relays the mobile terminal certificate with its own certificate to an authentication server. The authentication server authenticates the access point certificate and the mobile terminal certificate, and sends the certificate authentication response message with the authentication server's signature to the access point. The access point authenticates the authentication server signature, and sends to the mobile terminal a certificate authentication response message as access authentication response message. The mobile terminal on receiving the response message authenticates the authentication server signature and obtains the result of authentication of the access point certificate. This completes the authentication procedure between the mobile terminal and the access point.

In the US patent application with publication number US2005/0138351 A1, Jun. 23, 2005, a method for server certificate verification is provided for certificate-based authentication using the Extensible Authentication Protocol (EAP). The method pertains to the case when it is not possible to access the Internet and use, for example, a Certificate Revocation List (CRL) to verify the server certificate on-line. The method involves sending by a WLAN terminal of a server certificate verification request to an authentication server AS, the verification of the server certificate by the AS via transmission of online certificate status protocol (OCSP) message to an online certificate status protocol server and receiving the response, and thus ascertaining the result of the server certificate verification.

In the US patent application with publication number US 2006/0039305 A1, Feb. 23, 2006, a method and system for EAP encapsulation exchange in a WLAN is discussed. The method allows for authentication of a 802.11 client station without disrupting the access to any clients that are already authenticated and communicating in the network. An access point in the proposed system is configured so that it does not change its service set identifier (SSID) to configure new clients. This enables previously configured clients to continue to access an extended service set (ESS) while a new client is being configured.

All of the above mentioned approaches suffer from frequent message exchanges between an access point and a central authentication server located in the Internet or in a WLAN.

A method and mobile device system architecture for providing certificate-based cryptography for authenticating mobile devices is discussed in the US patent application with publication number WO 2005/065134 A2. The method involves transmission of certificate revocation information over a broadcast channel. The revocation information is received by the mobile device for verifying the validity of its certificate. This approach is, however not directly deployable within an existing 802.11i framework.

Managed access control to the GIANT infrastructure (GIANT stands for global-scale Internet access infrastructure) is one most important design task to ensure its operating health and organic growth. Existing LAN port authentication schemes, such as WPA and the next 802.11i standards, are based on the IEEE 802.1x framework and the extensible authentication protocol (EAP) as shown in FIG. 1. A supplicant, the entity in charge of access control contained in a mobile device 10, first authenticates against an authentication server 40 or a directory server in the case PKI-based EAP modes such as EAP-TLS and EAP-TTLS are employed, e.g. a RADIUS (remote authentication dial-in service protocol) or MS Active Directory server, through a closed port on the LAN access point, e.g., an Ethernet switch or a Wi-Fi access point. If the authentication is successful, the authentication server instructs the authenticator contained at the access point to open the port for other authorized network traffic, e.g., connections to other servers located in the LAN or the Internet. Although those authentication schemes, e.g., various standardized EAP methods, work well in an enterprise network, they do not directly apply in GIANT as illustrated in FIG. 2 for the following reasons. First, they do not scale to the size of GIANT. Designed for enterprise LANs with hundreds or even thousands of devices, the capacity of the authentication server will be seriously challenged in GIANT with millions of active devices and access points.

Second, the 802.1x framework and existing EAP methods are designed for LAN port authentication. All entities, including authentication server, directory server, access points, and devices, are usually deployed in the local enterprise network or even the same LAN segment. No specific provisioning for high accessibility to the authentication server is necessary. In GIANT, the authentication servers may be located in the wild Internet, far away from the clients and access points. Their accessibility is vulnerable to Internet outages. For example, BGP misconfigurations may disconnect access points in certain areas from the authentication server; a successful DDOS attack against the authentication server can shut down the entire GIANT.

Third, the authentication process involves several rounds of communications between the client and an authentication server, which may lead to high and variable delay in GIANT because the authentication server is located beyond the local area network in the Internet. In the case of packet loss, it will be difficult to gauge the timeout before the authentication can be resumed. This is exactly the case in GIANT when existing authentication methods defined in EAP, such as EAP-TLS, LEAP, and PEAP, were applied.

Finally, GIANT access points are owned by various entities. They may not trust or collaborate with each other when authenticating clients, unlike the scenario of an enterprise network where all access points are under the same administrative domain. This fact rules out all known fast re-authentication proposals for user mobility support, (e.g., EAP-FAST, eap-er, USRK-EMSK), since they are usually based on authentication credential handoff between neighboring access points. Frequent re-authentications with the central authentication server across the Internet seriously limit the performance of delay-sensitive applications such as the popular Skype VoIP.

SUMMARY

In an embodiment, the present invention provides a method for controlling Internet access of a mobile device by using a communication system which includes a number of access points connected to an Internet and to mobile devices. The method includes the steps of a) performing a certificate-based authentication between an access point, operating as an authentication access point, and an authenticating mobile device seeking access to an Internet, wherein the authenticating mobile device is disposed in the coverage area of the authentication access point; a1) transmitting a certificate from the mobile device over a wireless link to the authentication access point, wherein the transmitted certificate includes at least a mobile device identifier, the public key of the mobile device or user, and a timestamp indicating a lifetime of the certificate; a2) verifying the certificate by the authentication access point; a3) determining by the authentication access point, based on a certificate revocation list, whether the authenticating mobile device's certificate has been revoked prior to the expiration of the lifetime, wherein at least a portion of the certificate revocation list is stored at least temporarily at the authentication access point; and a4) granting the authenticating mobile device access to the Internet if the certificate has been verified successfully in the verifying step and not revoked prior to the expiration of the lifetime.

In another embodiment, the present invention provides a communication system for controlling Internet access of a mobile device. The communication system includes at least one mobile device including a storage medium configured to store a certificate including at least a mobile device identifier and a timestamp indicating a lifetime of the certificate; a transmitting device configured to transmit the certificate via a wireless link; a first certificate-based authentication module; and at least one access point connected to an Internet. The at least one access point includes: a second certificate-based authentication module; a verification device; a determining device configured to determine, on the basis of a certificate revocation list, whether the certificate has been revoked prior to the expiration of the lifetime; a storage device configured to store the certificate revocation list or a predetermined segment of the certificate revocation list at least temporarily; and an access granting device configured to grant the mobile device access to the Internet if the mobile device's certificate has been verified successfully and the certificate is absent from the certificate revocation list. The transmitting device is configured to transmit the certificate to the at least one access point. The verification device is configured to verify the certificate received from the at least one mobile device. The first certificate-based authentication module and the second certificate-based authentication module are configured to control an authentication between the at least one mobile device and the at least one access point.

BRIEF DESCRIPTION OF THE DRAWINGS

FIG. 3b shows a trusted peer-to-peer network as used in the embodiment of FIG. 3a;

FIG. 4 shows a block diagram of the authentication access point as shown in the embodiment of FIG. 3a;

DETAILED DESCRIPTION

Figure 1:
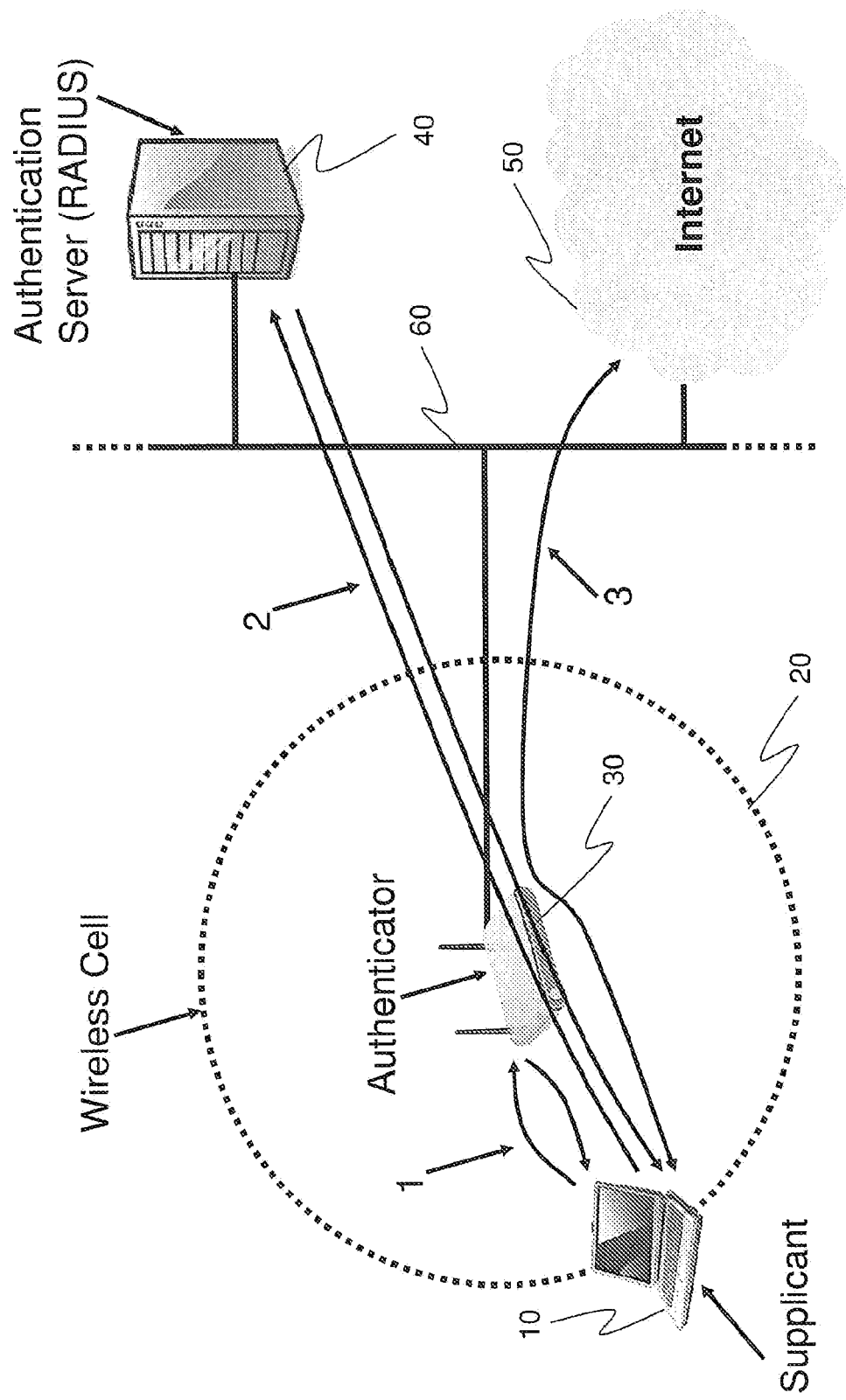
FIG. 1 shows an IEEE 802.1x LAN port authentication framework according to the prior art.

By way of overview and introduction, the invention is embodied in methods and communication systems for controlling Internet access of a mobile device, which facilitates scalability of the system and drastically reduces the unpredictability and potential unreliability of a centrally controlled authentication.

A further embodiment of the invention provides a certificate-based authentication on the edge of the Internet by localizing and distributing the authentication process on the access points of open Wi-Fi networks that is used for access control of nomadic users. The invention may rely on a central server to manage, maintain, administer and disseminate updates of authentication credentials, however, as a task separate from authentication itself. A certificate-based authentication has the advantage that it requires no user interaction during authentication as compared to password based schemes.

One embodiment of the invention builds a global-scale Internet access infrastructure, shortly called a GIANT system, from autonomous, independently owned Internet connections, e.g. DSL connections, at home and other private properties.

The invention is embodied in a method that controls Internet access of a mobile device by using a communication system which comprises a number of access points connected to the Internet and mobile devices. The mobile devices may be wireless PDAs, notebooks or the like. This embodiment includes the steps of:

a) Performing a certificate-based authentication between an access point, operating as an authentication access point, and an authenticating mobile device, which is located in the coverage area of the authentication access point and desires to gain access to the Internet by:

a1) Transmitting a certificate, which includes at least a mobile device identifier, the public key of the mobile device or user and a timestamp indicating the lifetime of the certificate, from the mobile device over a wireless link to the authentication access point;

a2) Verifying the certificate by the authentication access point;

a3) on the basis of a certificate revocation list (CRL for short) determining by the authentication access point whether the authenticating mobile device's certificate has been revoked prior to the expiration of its lifetime, wherein the certificate revocation list or a predetermined segment of the certificate revocation list is stored at least temporarily on the authentication access point; and a4) Granting the authenticating mobile device access to the Internet, if the certificate has been verified successfully in step a2) and not revoked prior to the expiration of its lifetime.

The certificate revocation list contains the certificates of all participating mobile devices which have been revoked before their individual lifetime has expired.

To facilitate the scalability of the communication system and to reduce the amount of authentication-related information via the unreliable Internet the embodied method can also include the steps of:

b) defining a plurality of groups, wherein each group comprises a plurality of access points and a plurality of mobile devices;

c) segmenting the certificate revocation list (CRL) into a plurality of CRL segments and associating a unique CRL segment identifier with each CRL segment, wherein each CRL segment represents a separate group;

d) storing for each group the same CRL segment on each access point of the respective group and storing for each group the same CRL segment identifier associated with the respective group on each mobile device of the respective group;

e) determining by the authentication access point on the basis of the CRL segment identifier received from the authenticating mobile device, whether it belongs to the same group as the mobile device; e1) if yes, determining, at step a3), on the basis of the CRL segment stored on the authentication access point whether the authenticating mobile device's certificate has been revoked prior to the expiration of its lifetime;

e2) if it belongs not to the same group, requesting for the CRL segment which is represented by the CRL segment identifier received from the authenticating mobile device and determining, at step a3), on the basis of the requested CRL segment whether the authenticating mobile device's certificate has been revoked prior to the expiration of its lifetime.

A group is defined by assigning the access points and mobile devices owned by all users associated with that group the same CRL segment identifier. A CRL segment thus contains the revoked certificates of all mobile devices of the group associated with the respective CRL segment. In one embodiment, a CRL segment identifier is embedded in a certificate.

In order to maximize the number of local authentication the users are grouped by dividing a physical area into a plurality of geographical zones, wherein each zone is represented by a separate CRL segment. As a result, each group is defined by a separate geographical zone.

The concept of grouping the users is based on the fact, that users typically spend most of their time in a small number of physical locations (in the same town, at work, at home, at a favourite cafe). Therefore the majority of authentications can be optimized if the access points in the same physical locations share the same CRL segment. In this way, users living in the same geographical zone, most likely to be authenticating each other, share the same CRL segment and therefore do not need to perform any remote CRL verification, saving both in authentication latency and network bandwidth.

In a further embodiment step e2) also includes the step of forwarding the requested CRL segment to the authentication access point from an access point which belongs to the group represented by the CRL segment identifier stored on the authenticating mobile device, or from a central server storing all CRL segments and their unique CRL segment identifiers.

In order to save further network bandwidth and reduce the traffic of authentication related information via the Internet, each mobile device stores the respective CRL segment which is forwarded to and used by the authentication access point to authenticate the authenticating mobile device. In this case, the authentication access point needs to check the age of the foreign CRL segment received from the mobile device. Therefore, the method comprises the steps of:
  assigning each CRL segment a CRL segment timestamp indicating the time of generation or of the last update of the respective CRL segment;
  storing a newly generated or currently updated CRL segment together with its CRL segment timestamp and its CRL segment identifier on the central server and on each access point of the group represented by the respective CRL segment;
  storing on each mobile device of each group the same CRL segment which represents the respective group and the timestamp associated with the respective CRL segment;
  and wherein step e2) comprises the step of:
i) forwarding the requested CRL segment and the timestamp associated therewith from the authenticating mobile device to the authentication access point;
ii) forwarding a request for a CRL segment reference timestamp from the authentication access point to the central server or the group of access points which is represented by the CRL segment stored on the authenticating mobile device;
iii) forwarding the requested CRL segment reference timestamp to the authentication access point;
iv) determining by the authentication access point whether the CRL segment timestamp received from the authenticating mobile device matches the CRL segment reference timestamp, or lies within a predetermined time interval;
if yes, determining, at step a3), on the basis of the CRL segment received from the authenticating mobile device whether the authenticating mobile device's certificate has been revoked prior to the expiration of its lifetime.

The request includes for example the CRL segment identifier received from the authenticating mobile device and the IP address of the authentication access point.

If it is determined, in step iv), that the CRL segment timestamp is too old, the authentication process may be stopped or interrupted.

To reduce the number of lookups of CRL segment reference timestamp the method comprises the steps of
  determining by the authentication access point whether the CRL segment timestamp received from the authenticating mobile device is deemed to be valid;
if yes, determining, at step a3), on the basis of the CRL segment received from the authenticating mobile device whether the mobile device's certificate has been revoked prior to the expiration of its lifetime;
proceeding with step ii) if the CRL segment timestamp is deemed to be non-valid.

To provide a trustworthy lookup function to map a CRL segment identifier to a CRL segment and its CRL segment timestamp, respectively the request for a CRL segment reference timestamp and the requested CRL segment reference timestamp are transmitted over a trusted peer-to-peer network arranged by the access points using information on the basis of a trusted friendship of the owners of the access points.

A trusted peer-to-peer network can be built by storing on each access point the user identifiers and the current IP-addresses of its friendship access points, the number of intra-zone connections of each friendship access point, the CRL segment identifiers, each representing the geographical zone which the respective friendship access point belongs to, and a listing of all geographical zones and their coordinates. A user identifier may be the user name of the owners of the respective access points.

In another embodiment the method for building a trusted peer-to-peer network further comprises the steps of:
  centrally storing a listing which assigns for each access point its current IP-address to its user identifier;
  retrieving from the listing the current IP-address of at least one of the friendship access points of a first access point;
  establishing a connection from the first access point to its at least one friendship access point using the retrieved IP-address;
  performing a predetermined authentication between the first access point and its friendship access point to establish a trusted connection there between;
exchanging the number of intra-zone connections and the CRL segment identifier between the access points;
  repeating these steps with respect to each access point, wherein each access point only updates its own IP-address on the listing.

In an embodiment the request for the CRL segment reference timestamp is transmitted from the authentication access point to the geographical zone which is represented by the same CRL segment identifier as stored on the authenticating mobile by using a location based routing algorithm. The location based routing algorithm performed on the access points uses the coordinates of the geographical zones and the CRL segment identifier received from authenticating mobile device to find the access point which stores the requested CRL segment reference timestamp. The request is only routed over the authentication access point's friendship access points and the friendship access points of its friendship access points.

In another embodiment the location-based routing algorithm is the known GFG algorithm.

If an access point, for example the authentication access point, only has links to friendship access points in the same geographical zone, the request is firstly transmitted from the authentication access point to its friendship access point with the most intra-zone connections. Selecting a friendship access point with the most intra-zone connections increases the likelihood of finding a long distance link toward the destination. Then, the GFG algorithm is started or resumed. The term "intra-zone connection" determines an existing link between two friendship access points located in the same geographical zone.

In another embodiment, a CRL segment is updated on the central server in dependence of a predetermined event, e.g. if a certificate has been revoked. In addition, a new timestamp is generated indicating the time of update. The updated CRL segment and the timestamp associated therewith are forwarded from the central server to at least one access point of the group represented by the updated CRL segment. The updated CRL segment together with its timestamp are forwarded from the respective access point to its friendship access points which belong to the same group by using the list of friendship access points stored on each access point.

In another embodiment the CRL segment reference timestamp request by the authentication access point corresponds to the most recent CRL segment timestamp which indicates in general the last update of the respective CRL segment.

In another embodiment all access points of the communication system are centrally registered.

A communication system controls Internet access of a mobile device. The system includes at least one access point connected to the Internet, the access point comprising a certificate-based authentication module, means for verifying a certificate received from a mobile device, means for determining on the basis of a certificate revocation list whether the certificate has been revoked prior to the expiration of its lifetime, storage means for storing the certificate revocation list or a predetermined segment of the certificate revocation list at least temporarily, and means for granting a mobile device access to the Internet, if the mobile device's certificate has been verified successfully and is not included in the certificate revocation list;

at least one mobile device which comprises a storage for storing a certificate, which includes at least a mobile device identifier and a timestamp indicating the lifetime of the certificate, means for transmitting the certificate via a wireless link to the access point, a certificate-based authentication module, wherein the certificate-based authentication module of the mobile device and the access point are adapted to control the authentication between the mobile device and the access point.

In an embodiment of the communication system, a central server having a storage which stores a plurality of CRL segments which the certificate revocation list has been divided in, wherein a unique CRL segment identifier is associated with each CRL segment, a plurality of geographical zones which a physical area is divided in, wherein each geographical zone is associated with a separate CRL segment, wherein each geographical zone comprises a plurality of access points and a plurality of mobile devices.

In another embodiment each access point and each mobile device associated with the same geographical zone store the same CRL segment representing the respective geographical zone, wherein the CRL segment identifier associated with the CRL segment is embedded in the certificate stored on each mobile device.

Each access point may comprise means for determining on the basis of the CRL segment identifier received from the mobile device, whether it belongs to the same geographical zone as the mobile device and means for determining on the basis of the stored CRL segment whether the mobile device's certificate has been revoked prior to the expiration of its lifetime.

In addition, each access point may comprise means for generating a request for the CRL segment which is represented by the CRL segment identifier received from the mobile device and means for determining on the basis of the requested CRL segment whether the mobile device's certificate has been revoked prior to the expiration of its lifetime.

In another embodiment, each access point and/or the central server are adapted to forward a CRL segment on request to a requesting access point.

In another embodiment, the central server may be adapted to assign each CRL segment a CRL segment timestamp indicating the time of generation or of the last update of the respective CRL segment. Each access point and each mobile device may further comprise means for storing a newly generated or currently updated CRL segment together with a CRL segment timestamp assigned thereto. In addition, each mobile device may be adapted to further transmit its stored CRL segment and the timestamp associated therewith to the access point. Each access point is further adapted to forward a request for a CRL segment reference timestamp to the central server or to the geographical zone which includes the access points having stored the requested CRL segment reference timestamp;

determine whether the CRL segment timestamp received from the authenticating mobile device matches the received CRL segment reference timestamp, or lies within a predetermined time interval.

In another embodiment the access points are arranged to a trusted peer-to-peer network. In this case, each access point may store the user identifiers and the current IP-addresses of its friendship access points, the number of intra-zone connections of each friendship access point, the CRL segment identifiers, each representing the geographical zone which the respective friendship access point belongs to, and a listing of all geographical zones and their coordinates.

In another embodiment, a central storage is provided for storing a listing which assigns for each access point its current IP-address to its user identifier. Each access point is then adapted to retrieve from the listing the current IP-address of at least one of its friendship access points and to establish a connection to the friendship access point using the retrieved IP-address, the certificate-based authentication module of each access point being adapted to perform a predetermined authentication with its friendship access point to establish a trusted connection therebetween;

exchange the number of intra-zone connections and the CRL segment identifier with its friendship access point over the trusted connection, and update only its own IP-address on the listing.

In another embodiment, the central server is adapted to update a CRL segment in dependence of a predetermined event and to forward the updated CRL segment to at least one access point located in the geographical zone represented by the updated CRL segment; and wherein the access point is adapted to forward the updated CRL segment to its friendship access points which are located in the same geographical zone.

In addition, a wireless access point is provided which is adapted to perform a certificate-based authentication with a mobile device of a communication system.

Moreover, a mobile device is provided which is adapted to perform a certificate-based authentication with an access point of a communication system.

Furthermore, a computer program is provided which may be implemented on an access point and a mobile device. The computer program has stored a plurality of instructions readable by a processor for controlling Internet access of the mobile device.

Following the peer-to-peer spirit, individual users share their subscribed broadband access (e.g. DSL) over their private wireless access points, preferably under the supervision of a single authoritative party. The method to construction and maintenance of a global-scale Internet access infrastructure based on privately owned wireless Internet access points (either residential or small business), henceforth called GIANT, is simple: a user opens up her own Internet connection to other participating users who are nearby the user's private Internet point of attachment. In return, when she is away from her own fixed Internet connection, the user is granted Internet access through other compliant users' wireless routers in range. The authority party is responsible for managing user credentials and handling billing.

AGE's mechanisms make it applicable to GIANT networks. AGE supports a single authentication authority allowing clients to access the service anywhere in the world with the same user id and authentication credentials. Authentication in AGE proceeds with as little user interaction as possible (the user only has to select the GIANT SSID for association) and AGE is resilient to the variable network conditions in GIANT including potential loss of connectivity to the central server.

At its foundation AGE is based on a combination of an Extensible Authentication Protocol (EAP), and a Transport Level Security (TLS) authentication. As is readily understood by a person of ordinary skill in the art, an EAP method uses certificates and private keys. The TLS authentication method avoids the use of passwords and allows mutual authentication of the authenticator (access point) and supplicant (mobile client). A central server operates the AGE certificate authority (CA) which manages the certificates for all GIANT users. The central server pushes updates to all relevant parties when authentication material changes. To continue operation in the face of server failure and avoid delays caused from accessing an authentication server in the Internet, each AGE access point (AP) runs a self contained authenticator, confining the authentication process to the wireless link only. The CA root certificate is embedded at every entity allowing clients and access points to verify each others certificates locally. AGE uses Certificate Revocation Lists (CRLs) to inform AGE entities when a certificate has been revoked before its expiration. The CRL is also maintained by the AGE central server. Rather than querying the central server during each authentication, in AGE each entity carries the most recent CRL along with its certificate and exchanges the CRL during authentication. Because of GIANT's large size with millions or tens of millions of access points and mobile devices the size of the CRL could strain the storage capacity of AGE entities. Therefore the AGE server divides the CRL into segments. Each CRL segment states the validity of a set of certificates, in essence providing a more up to date validation of a certificates. The situation might arise that the timestamp on an unknown CRL segment violates the security policy of the authenticating AP. In this case AGE maintains a peer-to-peer social overlay network for satisfying trusted freshness queries. The social overlay is built through friendships with other GIANT users and is maintained by the AP owner himself. AGE makes no stipulation on the freshness constraints imposed by any access point.

AGE has been implemented as a new EAP module for the FreeRADIUS server and wpa supplicant Linux software packages. The software has been ported to the OpenWRT open source router firmware for the Linksys WRT home wireless router. AGE is immune from Internet delays and achieves low authentication times, continues correct operation in the face of failure of the central server, and is secure. Measurement results comparing EAP-AGE to EAP-TLS in the GIANT scenario shows that AGE satisfies requests with 49.7% lower minimum delay and 71.6% lower maximum delay, around 490 msec and 1614 msec respectively, showing much tighter bounds on delay variation. Using a large social network derived from users of the SMS service of a large nationwide cellular provider we show that social connections can satisfy reachability requirements for AGE's social network and that with 5 or more friends AGE's social network would provide a high success rate of lookups. Finally, a analysis on AGE's security features shows that AGE achieves the same level of security against known threats as private wireless access points.

One embodiment, for example, aggregates a peer-to-peer installation of individual Wi-Fi Internet connections into a large-scale shared Internet access infrastructure. From an individual user's perspective the bandwidth of her fixed broadband Internet connection is made portable with a very small amount of one-time investment in the installation of a software-upgraded Wi-Fi access point (a.k.a. wireless router). These networks are easy for the operator to deploy due to their self expanding nature.

Figure 2:
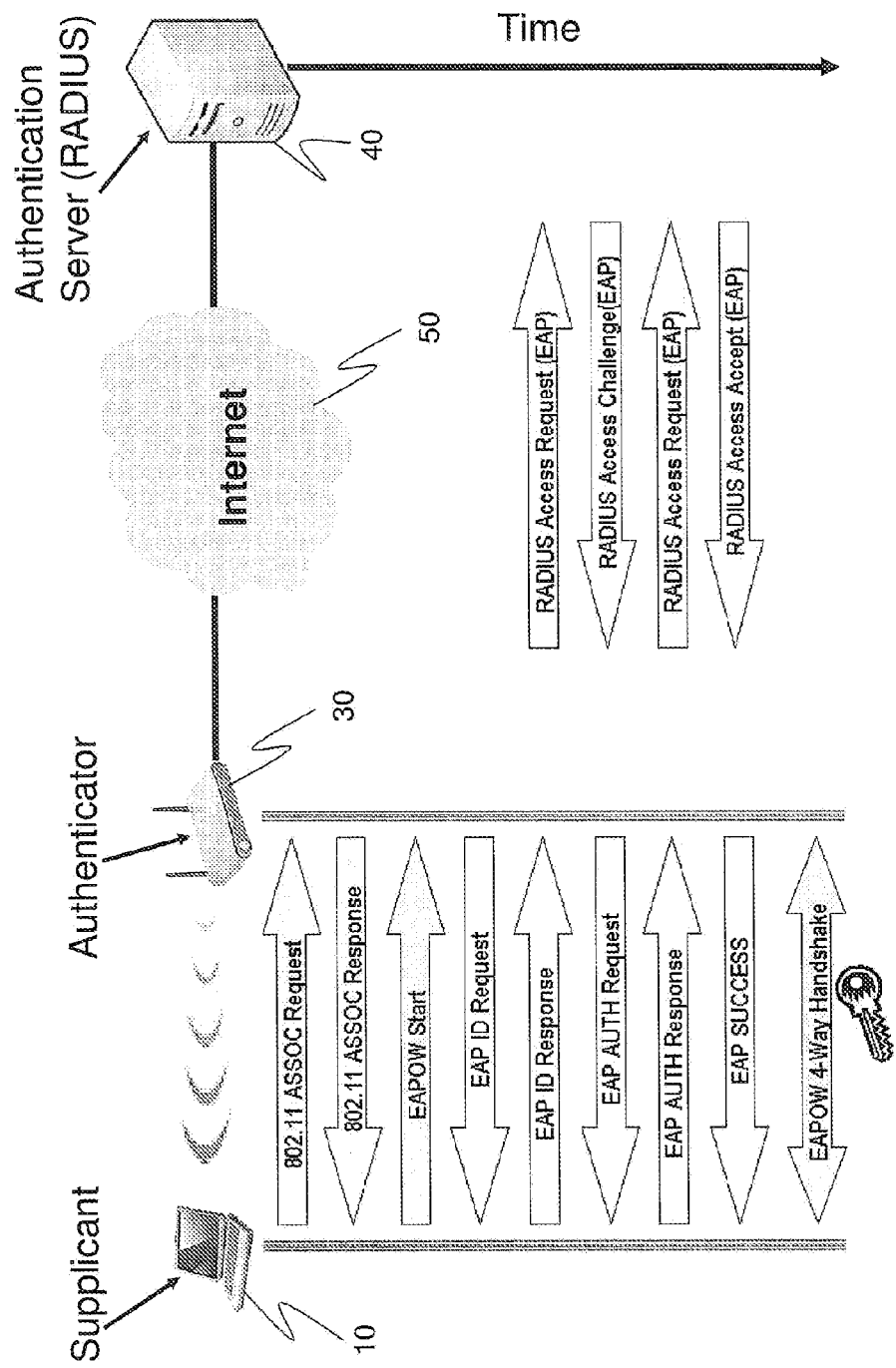
FIG. 2 shows a communication system using a central authentication server in accordance with the prior art.
Figure 3A:
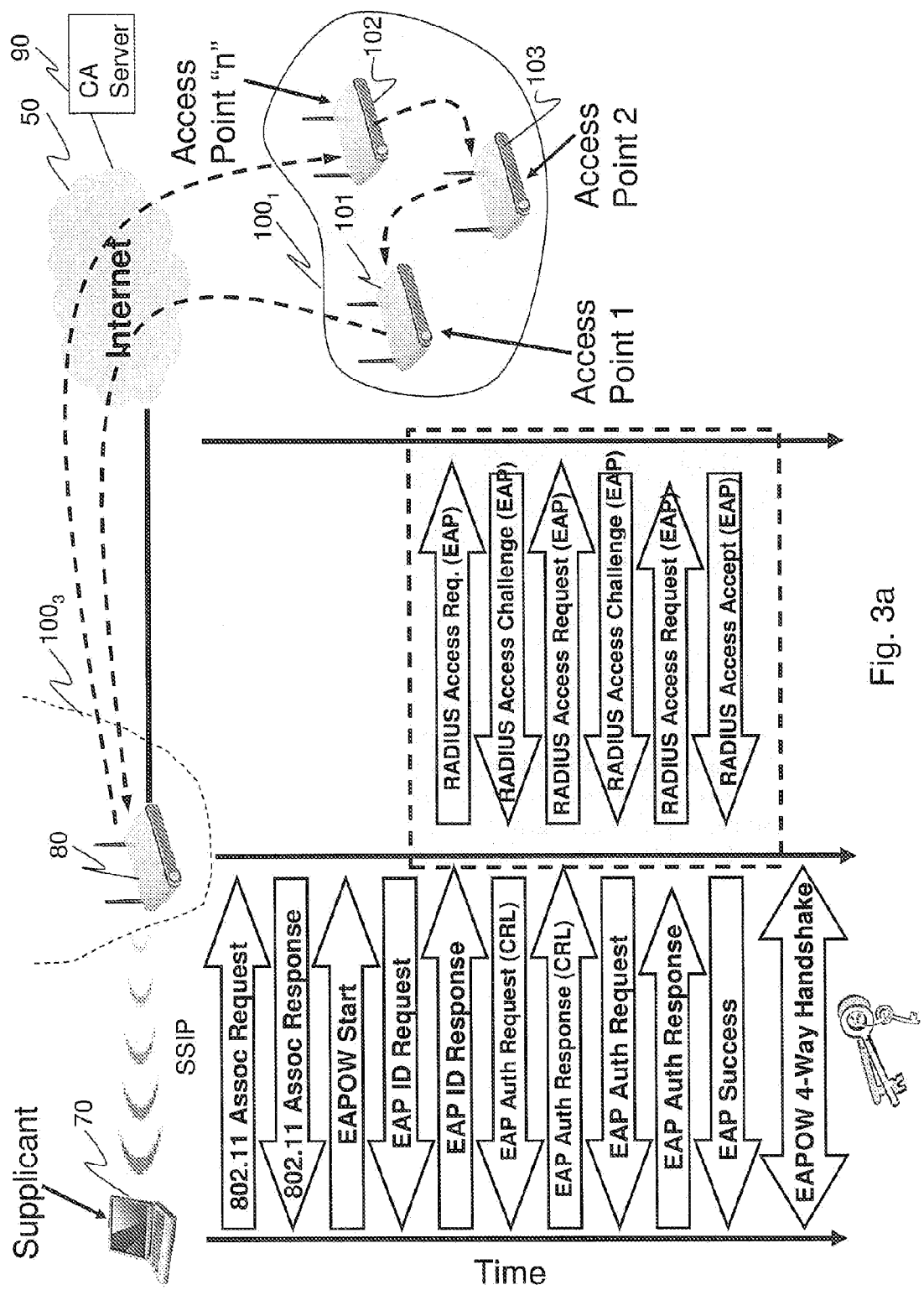
FIG. 3a shows a diagram of the authentication process performed on the edge of the Internet in accordance with an embodiment of the invention.
Figure 3B:
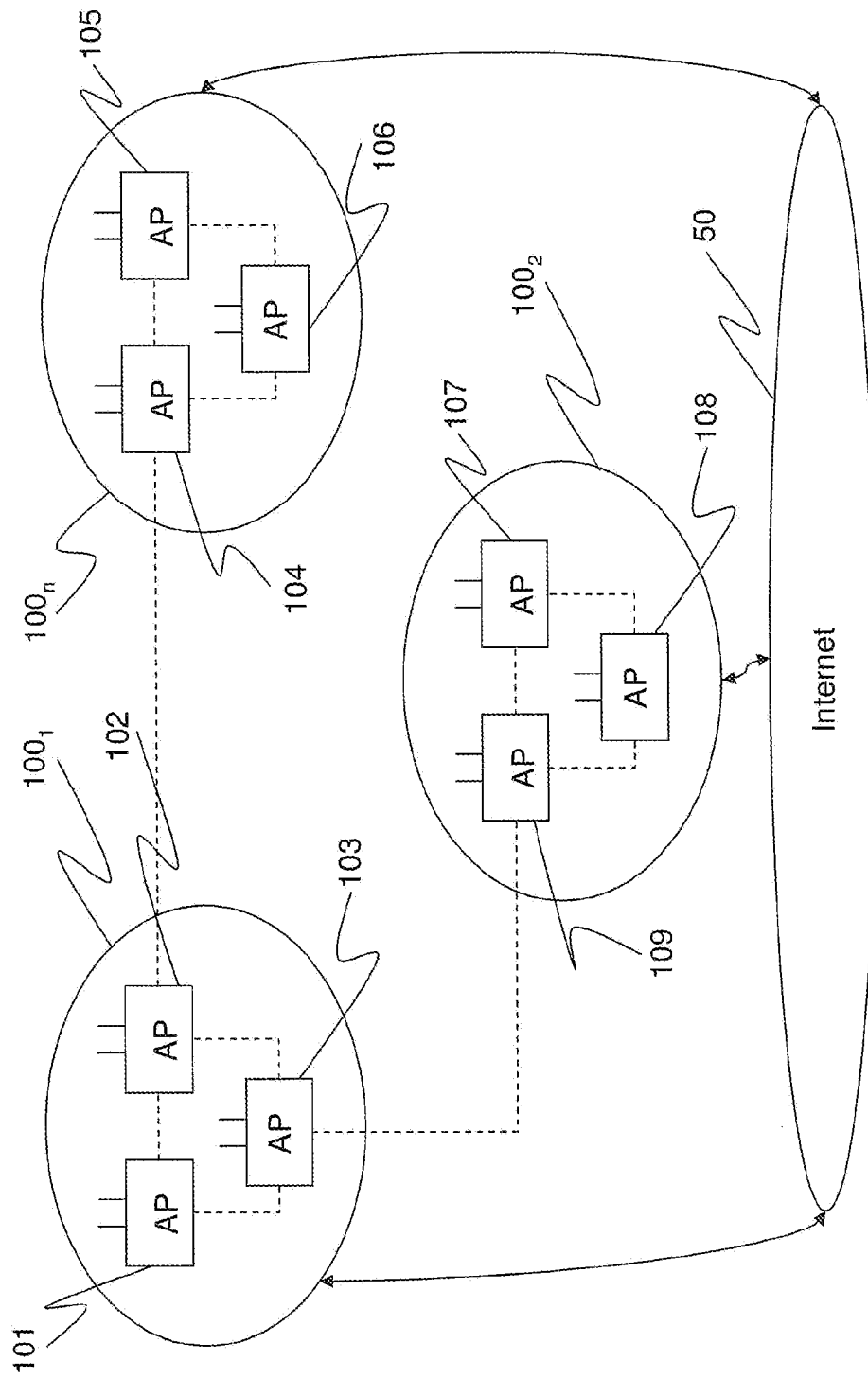

FIG. 3a shows an exemplary communication system based on a global-scale Internet access infrastructure for use in populated areas which allows clients to access the Internet anywhere in the world with the same user id and authentication credentials. The communication system comprises an access point 80 located in a geographical zone $100_3$ and a mobile device 70, e.g. a notebook having a wireless interface for communicating with the access point 80. It is to be noted that a plurality of access points and mobile devices may be located in the zone $100_3$. Access point 80 is connected to the Internet 50, e.g. via a DSL line. The communication system further includes a plurality of access points 101, 102 and 103, which are located in another geographical zone $100_1$, a plurality of access points 107, 108 and 109 located in a geographical zone $100_2$ and a plurality of access points 104, 105 and 106 located in a geographical zone $100_n$, as shown in FIG. 3b. All access points can be connected to each other via the Internet 50 which is indicated by the dotted lines in FIG. 2b. As will be illustrated below, all access points build a trusted peer-peer network to support a localized and decentralized authentication process for example between the mobile device 70 and the access point 80. Each access point shown in FIGS. 3a and 3b is owned by a private entity. Furthermore, a central CA server 90 owned by a certificate authority (CA) is also connected to the Internet 50. It is to be assumed that the certificate authority has issued a certificate for each mobile device and access point which belong to the communication system.

Figure 4:
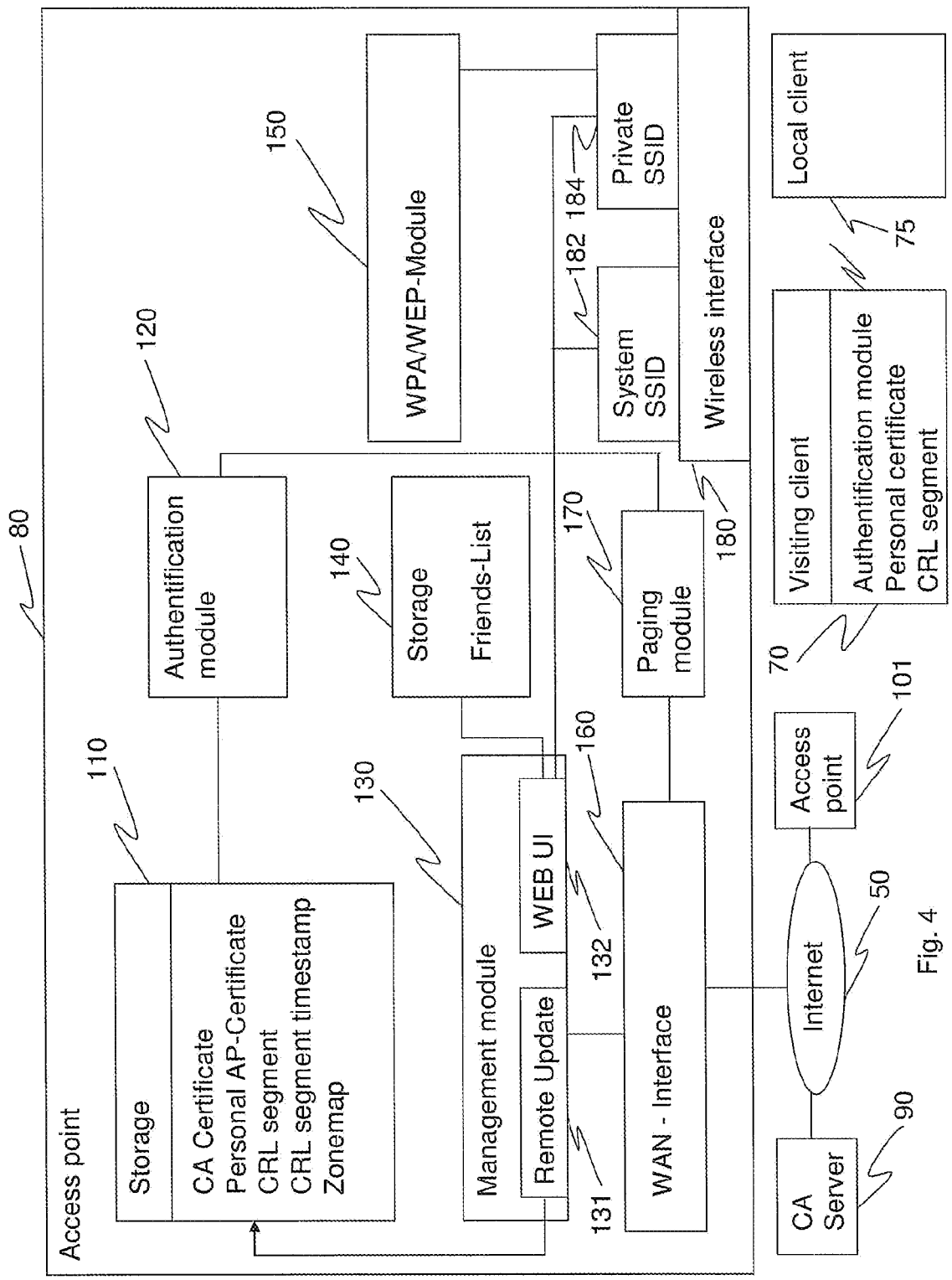

FIG. 4 shows in detail the access point 80. The other access points are implemented in a similar way. The access point 80 includes a storage 110 for storing a CA certificate issued by a certificate authority. The CA certificate includes the public key of the certificate authority used to decrypt a personal certificate which is encrypted by the private key of the certificate authority. The personal certificate issued by the certificate authority is also stored in the storage 110. The personal certificate includes a user identifier, identifying the access point 80 or the owner of the access point, a public key associated with the access point 80, a timestamp defining the certificate's lifetime and a CRL segment identifier identifying CRL segment. The CRL segment is also stored on the storage 110. Furthermore, a CRL segment timestamp is stored on the storage 110 indicating the date of generation or the last update of the CRL segment. In addition, the geographical zones $100_1$ to $100_n$ and their coordinates are stored on the storage 110. The access point 80 comprises a storage 140 storing a list of the user names of friendship access points to which trusted connection can be established. A paging module 170 is used to retrieve from a central database (not shown) the current IP-addresses of the friendship access points. The database stores a listing which associates each user name the respective current IP address. The access point 80 is connected to Internet 50 via a WAN-Interface 160. A management module 130 comprises a WEB user interface 132 to allow the owner of the access point 80 to enter the user names of its friendship access points. The management module 130 further includes a remote update module 131 which serves to forward the CRL timestamp to a requesting access point. Furthermore, a WPA/WEP module 150 is implemented to support an encrypted wireless communication between the access point 80 and a mobile device. The access point 80 communicates via a wireless interface 180 with the mobile device 70. It is assumed that the mobile device 70 is a visiting client. With other words, the CRL segment stored on the mobile device 70 and the CRL segment stored in storage 110 of the access point may or may not be identical depending on whether the access point and the mobile device belong to the same geographical area. To communicate with the access point 80 a system SSID 182 is used. In addition, the access point 80 can communicate with its local mobile device 75 by using the private SSID. It is to be noted that the local mobile device 75 and the access point store the same CRL segment. By using a system SSID and private SSID the access point 80 works as a virtual access point to serve the visiting client 70 and the local client 75. Each mobile device also stores its personal certificate and an authentication module. In the present case it is assumed, that the visiting client 70 stores a CRL segment which represents the geographical zone $100_1$ whereas the access point stores a CRL segment representing the geographical zone $100_3$. It is to be noted, that alternatively, the visiting client 70 may store the same CRL segment as the access point 80. In this case the access point 80 uses the CRL segment stored in the storage 110 to authenticate the visiting client 70 or its local client 75. The local client 75 and the access point 80 are owned by the same user.

In one embodiment, a physical area has been divided in the geographical zones $100_1$ to $100_n$. Preferably, the zones are non-overlaping each other. Next, the certificate revocation list CRL is segmented in n CRL segments, wherein each CRL segment is associated with a respective zone such that each mobile device which is owned by the users located in the respective geographical zone are considered. For example, the CRL segment associated with zone $100_1$ only includes the revoked certificates of the mobile devices which belong to users located in zone $100_1$. In a similar way, the other CRL segments are associated with the remaining geographical zones. Furthermore, each CRL segment is defined by a unique CRL segment identifier which is stored in the respective certificates. For example, the certificate stored on the visiting mobile device 75 carries the CRL segment identifier of the CRL segment associated with the zone $100_1$.

If the visiting client 70 seeks to get access to the Internet 50 an authentication process is performed between the access point 80 and the mobile device 70 which is schematically shown in FIG. 3a. It is to be noted, that the mobile device 70 operates as an authenticating device whereas the access point 80 works as an authentication access point. The first messages exchanged between the authentication modules of the access point 80 and the mobile device 70 are defined by the known EAP-TLS protocol to forward at least the mobile device's certificate to the access point 80. Next, the CRL segment stored on the mobile device 70 is requested by the authentication module 120 of the access point. The CRL segment and the timestamp associated therewith are transmitted in EAP-TLS packets via an encrypted wireless link to the access point 80. It is to be noted that the authentication modules implemented on the access point 80 and the mobile device 70 may include RADIUS server. To verify the age of the CRL segment received from the mobile device 70 the access point 80 uses the CRL segment identifier embedded in the mobile device's certificate to find a suitable access point. By using the zone map stored in storage 110 the access point knows that the CRL segment identifier defines the geographical zone $100_1$. The access point 80 transmits a request for a CRL segment reference timestamp towards the zone $100_1$ using its friends list. A trusted path is then established over the Internet 50 by forwarding the request message only to a friendship access point of the access point and, if necessary, to friendship access points of friendship access points. The request message arrives at the destination if an access point in zone $100_1$ has been found, e.g. access point 103. During the establishment of a trusted path a RADIUS authentication process is performed between each pair of access points, as shown schematically by RADIUS access messages in FIG. 3a. Next, the destination access point 103 returns its CRL segment timestamp as the reference timestamp to the requesting access point 80 by using its IP-address. The authentication module 120 then compares the reference timestamp with the CRL segment timestamp received from the mobile device 70. The mobile device 70 gets access to the Internet 50, if a) the timestamps are equal or the CRL segment timestamp of the mobile device 70 lies within a predetermined time interval and b) the certificate received from the mobile device 70 is valid. Otherwise the authentication process is stopped.

The unreliable wide-area connection via the Internet 50 has considerable impact on the existing IEEE 802.1x authentication process. To quantify the effect on authentication success rates a measurement study was conducted on WPA EAP-TLS authentications in a GIANT-like deployment. A RADIUS authentication server configured for EAP-TLS authentication was installed in the United States. A client supplicant in Europe attempted an EAP-TLS authentication through a local wireless access point once every minute. Tunnelling EAP messages through RADIUS does not use reliable transport meaning it is vulnerable to any lost packet. In the seven day period of the study approximately 1% of all authentications experienced a timeout on average. A maximum of 2.1% of authentication attempts per day suffered a timeout. Compared to local deployments with close to 100% success rate the penalty is high. Note that the impact of every lost packet is considerable given the default 30-second timeout in most implementations. These measurements were also taken under favourable conditions: the authenticator contacted an unloaded authentication server over a high speed LAN to the Abilene Internet2 network. Real deployments of AGE in residential areas connect over considerably slower and less reliable DSL or Cable connections. The capacity of the server and the network that hosts the server will be seriously challenged when handling large-volume of authentication requests from the entire GIANT. Also the impact of server failure will be much more severe when serving requests from millions of users. Although the overloading problem can be alleviated by re-directing the request to other authorized delegates, it will significantly increase the operation and maintenance cost, requiring constant adaptation of the backend infrastructure to respond to GIANT's unplanned growth.

Finally, as access points in the GIANT system as shown in FIGS. 3a and 3b multiplex wireless connectivity of their owners and other nomadic visitors multiple wireless networks with different security profiles, traffic shaping and prioritization policies need to be advertised and served by each of these access points. Virtualization of the access points (see B. Aboba, *Virtual Access Points*, May 2003. IEEE P802.11 Wireless LANs) is a key requirement towards the wide acceptance of GIANT among performance and security concerned users. A virtualised access point is implemented by using a private SSID and a global system SSID.

GIANT should provide equivalent security provisions for both the public and the private networks. The fact of GIANT's independently operated access points introduces a number of security challenges. The privately controlled access points must be considered malicious at all times. The lack of control of the underlying infrastructure means that authentication crosses untrusted paths opening the door for man-in-the-middle, wormhole, and spoofing attacks. Malicious nodes have the ability to collaborate with each other and perform coordinated attacks. These attacks could result in forged authentication material, replay of old material or the capture of authentication credentials. Also, in the case of centralized authentication the well-known authentication server is vulnerable to denial of service attacks through the Internet.

To address the challenges of scale, outages, delay and security an authentication process on the edge of the Internet 50 is performed, wherein the authentication process is localized on the access points and avoids the unpredictability and potential unreliability of Internet-based authentication. The authentication process comprises for example three components: mutual authentication, for example, between the access point 80 and the mobile device 70, distribution of different CRL segments to the access points and mobile devices at different locations, and a fallback peer-to-peer lookup of the freshness of the CRL segments.

The communication system achieves scalability and resiliency by excluding the on-line involvement of a back-end authentication/directory server. Instead the following three mechanisms, as illustrated in FIG. 3a may be employed: First, a certificate based authentication is performed using PKI-based certificates that are issued by a trusted central authority CA and are publicly verifiable given the central authority's public key. By installing the CA public key on each GIANT entity, i.e. access points and mobile devices, the central authority is not necessary for most client verifications. Authentication can be confined to the edge of the Internet without crossing any WAN links, thereby reducing roundtrip time overhead during authentication. Certificate based authentication also has the advantage that it requires no user interaction during authentication compared to password based schemes.

Second, the central authority also maintains a certificate revocation list (CRL) to track certificates throughout their lifetime, which is usually on the order of months or even years. During that time it may be necessary to revoke a user's certificate because of cancellation of service or punitive reasons. To maintain localized authentication it is necessary that each GIANT entity also carries the CRL along with its certificate. Given GIANT's global nature the number of entries in the CRL could be quite large resulting in a CRL that exceeds the storage capacity of the access points and/or mobile devices. Therefore the CRL is partitioned and managed in CRL segments, each of which conceptually restates the non-validity of certificates in a given certificate subspace or geographical zone, as defined by certificate names. The name of every certificate falls in a subspace encoded by a CRL segment also called the "containing CRL segment" for that certified name. A certificate's non-existence in its CRL segment proves the validity of the certificate up to the time when the CRL segment is generated.

In more detail, each GIANT entity, i.e. an authentication-enabled access point or mobile client, stores locally its CRL segment for use during localized authentication. Rather than requiring each entity to perform an online query to find the authenticating peer's CRL segment, the two entities simply exchange their CRL segments along with their certificates. Both the CRL segment and certificate are signed by the trusted CA and verifiable with the CA root certificate which includes the CA's public key. Thus the CRL segment serves as a more recent validation of the presented certificate.

Third, authentication-enabled access points are organized into a peer-to-peer social network, through which the freshness of a CRL segment can be verified without requiring a connection to a central authentication server. In some instances, however, even the CRL might be deemed too old for the access point's freshness criteria. In a global heterogeneous system of autonomous entities, it is difficult to reach consensus regarding the freshness criterion. Rather than enforcing a single freshness threshold, the CA maintains and publishes CRL segment timestamps, minimal files containing the last update time for each CRL segment, signed by the CA. When an access point needs to verify the freshness of CRL segment received from an authenticating mobile device, which is different from its own, it queries the communication system to find the most recently published timestamp. In a preferred embodiment, the access point may first try to contact the CA server 90 directly. In the case that the CA server 90 is overloaded or unavailable the access points of the communication system are organized into a peer-to-peer, friendship based overlay to support timestamp queries. The request is forwarded though the social network of friends, also referred to as friendship access point until it reaches some access point with the desired CRL segment. Because a single CRL segment covers many certificates it is therefore carried by more than one access point which increases the likelihood of the segment timestamp being found on the trusted friendship path. By having access points look up small timestamp files instead of transferring the entire CRL segment the network overhead for performing a freshness check is minimized.

It is important to note that the CRL segment freshness look-up, either through the back-end directory server 90 or through the social network overlay service, compromises the locality of the authentication process and therefore should be avoided whenever possible. Indeed, it is expected that such remote CRL segment timestamp checks will rarely be needed and only occur when very high confidence regarding the validity of a certificate is desired or a fraudulence attack suspected.

The authentication performed on the edge of the Internet AGE can be considered as an extension to the EAP-TLS method. After the EAP-Identity step of the EAP handshake the authentication access point, e.g. access point 80, responds with a preferred EAP type of EAP-AGE, a new EAP type. At this point the mobile device 70 and the authentication access point 80 exchange their CRL segments in the same manner as they transfer their certificates. The CRL segment is fragmented to fit in EAP's maximum packet size. Once the CRL segment transfer is complete the authentication access point optionally begins verification of the CRL segment freshness by initiating a query to the social network. While the query is completing the normal EAP-TLS handshake is resumed. At the moment that the authentication access point 80 verifies the mobile device's certificate it waits for the timestamp query to complete, if it has not already. If the presented CRL is valid the TLS verification continues as normal using the mobile device's CRL segment. Otherwise the authentication fails.

Generation of CRL Segments

Assigning the CRL segment to a given access point and mobile device is an important task. If an authenticating client, e.g. mobile device 70, has a different CRL segment then the authentication access point, e.g. access point 80, will be forced to lookup the CRL segment timestamp, incurring high overhead. On the other hand, if the authenticating mobile device and the authentication access point share the same CRL segment then no additional query is needed. Thus finding an ideal assignment for entities and CRL segments will have a big impact on reducing system large authentication delays. Users typically spend most of their time in a small number of physical locations, e.g. in the same town, at work, at home, at a favorite cafe. Therefore the majority of authentications can be optimized if entities in the same physical locations share the same CRL segment. In this way, users living in the same area, most likely to be authenticating each other, share the same CRL segment and therefore do not need to perform any remote CRL segment timestamp verification, saving both in authentication latency and network bandwidth. To perform the actual mapping of locations to CRL segments we define geographical zones which cover a well defined physical area. Each zone is covered by one CRL segment which is assigned a unique CRL segment id. Zones are identified by their real-world coordinates using the GPS coordinates of the zone. User certificates are generated with the CRL segment id embedded in the certificate. When authenticating a client the authentication access point can determine the client's correct CRL segment by reading the CRL segment id from the certificate. CRL segment timestamp is a 4 byte data segment signed by the CA's private key. Every entity is configured with a listing of all known zones and their locations, signed by the CA, the zone map. This map is used during social routing as described below.

CRL segment updates can be effectively distributed to mobile devices. For example, the mobile device 70 could automatically synchronize with its home access point, e.g. access point 102 whenever it is associated. The association is verified by the access point's certificate.

Building a Social Peer-to-Peer Network

An authentication access point with strict freshness requirements will need to validate each foreign CRL segment by looking up the CRL segment timestamp. To ensure authentication operation when the central authentication service is unavailable the access points arrange themselves into a peer-to-peer (p2p) network. The p2p network needs to support basic DHT functionality: mapping the CRL segment id to timestamps. However, traditional distributed hash tables (DHTs) are vulnerable to replay attacks where malicious access nodes can intercept requests for a particular key and respond with stale timestamps. This would allow an invalid client to continue accessing the Internet. Instead the access points organize themselves into a social overlay. Links are maintained between access points based on the friendship of the owners. The social network is built on the trust of the owners between each other.

On top of the trusted social network overlay there needs to be some type of routing scheme. The timestamp query is unique in that the query needs to be forwarded to a geographical zone, not a specific location. Any access point with the same CRL segment as the request can reply with the most recent CRL segment timestamp. The answer will be trusted because of the friend network. Routing through the social network then is a matter of finding a friend or a friend of a friend, etc. who is in the target zone. The intuition captured by the small world phenomenon (see J. Kleinberg, *The Small-World Phenomenon: An Algorithm Perspective*, pages 163-170, Proceedings of the Thirty Second Annual ACM Symposium on Theory of computing, New York, N.Y., USA, 2000. ACM Press) is that a friend closer to the target zone is more likely to know someone in the target zone. The intuition leads to an approach of greedily forwarding a request to the friend closest to the target.

The social network uses the location data of each zone, specified in the zone map stored on each access point, to forward messages between friendship access point. An access point's location is the same as the zone it is located in. The problem of forwarding messages in the social network then becomes the same as greedy forwarding in ad hoc and sensor wireless networks. Many solutions to this problem have been proposed in previous research (see e.g., P. Bose et al., *Routing With Guaranteed Delivery in Ad Hoc Wireless Networks*, Wireless Networks, 7(6):609-616, 2001; B. Karp et al., *GPSR: Greedy Perimeter Stateless Routing for Wireless Networks*, Proceedings of ACM MobiCom, 2000;] F. Kuhn et al., *Worst-Case Optimal and Average-Case Efficient Geometric Ad-Hoc Routing*, MobiHoc 2003: Proceedings of the 4th ACM International Symposium on Mobile Ad Hoc Networking & Computing, 2003; and B. Leong, et al., *Path Vector Face Routing: Geographic Routing with Local Face Information*, Proceedings of IEEE International Conference on Network Protocols 2005. In general in each of these protocols a node uses greedy forwarding until a void is reached in which the current node is closest amongst its neighbours to the destination. To recover, the protocol switches to some variant of face routing to traverse the edge of the void and continue progress. Face routing will only succeed on planar graphs in which no edges cross. The proposed social network, based on friendship connections over the zone map is clearly not planar. Using localized Delaunay triangulation (see J. Gao, et al., *Geometric Spanner for Routing in Mobile Networks*, MobiHoc 2001: Proceedings of the 2nd ACM International Symposium on Mobile Ad Hoc Networking & Computing, 2001), a node can convert his graph of friends into a planar graph for face routing. Although face routing protocols are well known to succeed in planar unit disk graphs, recent work has shown that not all variants succeed when routing in arbitrary undirected planar network graphs (see H. Frey et al., *On Delivery Guarantees of Face and Combined Greedy-Face Routing in Ad Hoc and Sensor Networks*, MobiCom 2006: Proceedings of the 12th Annual International Conference on Mobile Computing and Networking, 2006. Based on this result GFG (see P. Bose et al., *Routing with guaranteed delivery in ad hoc wireless networks*, Wireless Networks, 7(6):609-616, 2001, which is hereby incorporated by reference herein) may be used to perform routing in the social network.

The basic GFG routing will fail in the situation that an access point has trusted links only to access points located in the same zone. Because every access point in the same zone has the same location information to the GFG algorithm all of the nodes appear as a single node in the global graph. Thus a different approach is needed to make progress within the same zone. The communication system uses connectivity to other zones to select the best next hop in this case. For each of its overlay links the communication system also stores the number of intra-zone connections that that neighbour has. If all of a node's neighbours are in the same zone as it the node selects the neighbour with the most connections to a different zone as the next hop. In the extreme case that a node has no neighbours with intra-zone links the node randomly selects one of its neighbours to forward the message. In our trace analysis only 6% of nodes did not have a direct connection to another zone. Our analysis of a large social graph of users of a nationwide short message service shows that the friendship network is fully connected and has low diameter.

Bootstrap Paging System

The communication system supports a paging system to enable bootstrap of the social network. The paging system maps user ids with their current IP address. The paging system is built using a regular DET. Any of the popular DETs could be used. Nodes, i.e. access points insert their IP address into the DET under their user id (see I. Gupta et al., *Building an Efficient and Stable P2P DHT Through Increased Memory and Background Overhead*, Proceedings of the 2nd International Workshop on Peer-to-Peer Systems (IPTPS '03), 2003; S. Ratnasamy et al., *A Scalable Content-Addressable Network*, SIGCOMM '01: Proceedings of the 2001 Conference on Applications, Technologies, Architectures, and Protocols for Computer Communications, 2001 A. Rowstron et al., *Pastry: Scalable, Decentralized Object Location and Routing for Largescale Peer-to-Peer Systems*, Proceedings of Conference on Distributed Systems Platforms, Heidelberg, 2001; and I. Stoica et al., Chord: *A Scalable Peer-to-Peer Lookup Protocol for Internet Applications*, IEEE/ACM Transactions on Networking, 11(1):17-32, February 2003). The values are signed with the node's public key from its certificate. Access points query the paging system to find the current IP-address of a friend using the user id. Next the querying node performs EAP-TLS authentication with the node at the given IP address to confirm that the friend is still executing at the given address. Finally, if the authentication has succeeded then the friends exchange information, e.g. their friends list, for their routing tables.

The very first time an access point joins the communication system it registers itself with the central CA server 90. At this time the central CA server 90 feeds the new access point with the IP-addresses of the last n entities to register. The new access point uses these IP-addresses to bootstrap the paging system. On subsequent reboots the access point uses the cached IP-addresses of its friends. If a friend cannot be found in the paging system it is considered to be inactive. Each entity can only update its own location information in the paging DHT.

Routing Tables

Every access point of the communication system maintains a list of his/her friends who are also customers of the authentication service. A configuration tool, e.g. a website on the access point, allows the user to enter the usernames of his friends. To establish a friendship link the owner enters the usernames of other users with whom he is friends.

A simple configuration tool 132 runs on the access point 80 as an embedded webpage. The access point 80 maintains direct overlay links to each of his friends' access points. An access point maintains an internal routing list. Each entry contains the friend's containing CRL segment id and the current IP-address of the friend's access point. The routing table is augmented to also store the intra-zone connectivity of each friend. The routing table may be stored on storage 140 of the access point 80. The field is periodically updated via beacons to overcome network churn.

Insertion Tree

The central CA server 90 has to store the username to zone mappings for each access point in order to issue new certificates and maintain the CRL segments. Thus when a new CRL segment update is ready the central server 90 knows all of the access points that should receive that update. Using the paging system described above the location of each access point can be found. The central CA server 90 then pushes the update to each access point in turn. As access points receive updated CRL segments they begin forwarding the new CRL segment to their friends who are in the same zone. This helps cut the latency of the update and the load on the central server. Clients synchronize with their home access point whenever they are associated updating the CRL segment as necessary. In addition, if a client roams to a foreign access point in the same zone it can compare the time stamp of the CRL segment from the access point to its own keeping any newer CRL segments. In the same manner new certificates can be pushed to individual entities.

A primary goal of the evaluation was to measure the AGE's performance, confirm its correctness and verify that AGE is secure against attacks. We compared the authentication times of our AGE implementation against industry standard implementations of other similar authentication methods in a realistic GIANT deployment. To confirm that AGE's social network will sufficiently satisfy freshness queries we analyzed the social graph extracted from the users of the SMS service obtained from traces from a large nationwide cellular provider. We examined the relationships between users and the connectivity of users after dividing the users into AGE zones. We finish our evaluation with an analysis of potential attacks against AGE and the mechanisms AGE uses to thwart those attacks.

Implementation of AGE Framework

FIG. 3 shows the access point 80 and the relationship between all of the components.

The AGE process has been defined as a new EAP type. A new authentication module 120 has been added for EAP-AGE to the popular Linux client supplicant software wpa supplicant2 and the open source RADIUS authentication server FreeRADIUS3. In a preferred embodiment, the existing EAP-TLS methods have been modified by inserting the CRL segment exchange immediately following the EAP-Identity exchange. CRL segment timestamp verification is enabled for TLS. When the FreeRADIUS server 120 receives a new CRL segment it stores the CRL segment timestamp in a temporary location, for example in storage 110 of the access point 80. It then begins to validate the CRL segment timestamp in the background while the EAP handshake continues. The server 120 is configured with a CRL timestamp tolerance, which determines the acceptable age of any CRL segment. Using the OpenSSL library the CRL segment timestamp is checked. If the timestamp is older than tolerated then the authentication module 120 issues a lookup request to the social network component. The validation thread also inserts a hook into the OpenSSL TLS engine for retrieving the CRL segment timestamp. When the EAP-TLS authentication reaches the point of verification of the CRL segment timestamp it calls into the verification thread via the hook. The validating thread then blocks until a reply is received from the social network. If the returned CRL segment timestamp matches the CRL segment timestamp of the client's CRL segment then the TLS handshake ensues. Otherwise the validation thread returns an error and the TLS handshake fails. FreeRADIUS is configured by a new age section in the eap-.conf configuration file.

The social network is implemented as a library exporting the simple interface lookup which takes as an argument a CRL segment id. Each access point is configured with its list of friend usernames. Using the paging system 170 the access point determines the current IP address of each friend. Once the IP address is known the access point contacts the friend on a predefined port. The two access points exchange their CRL segment id and number of intra-zone connections. After contact the two access points begin exchanging heartbeats to update this information as the friend-list is further populated. Each access point is also configured with the zone map which is a mapping between the CRL segment id and GPS coordinates given in decimal format. The node pre-processes the file to determine which zones are its neighbouring zones and which are long distant zones. After the friendlist table has been completed the access point pre-computes the friend closest to each zone. The overhead is small because the number of zones is small, assuming around 1 million users per zone 6000 zones can cover the entire earth's population. When a request arrives the access point queries the pre-computed closest list to make the routing decision between greedy or face routing. In a preferred embodiment all of the access point's software is ported to the OpenWRT Linux distribution which runs on the Linksys WRT wireless access point. The firmware is 2.8 MB which fits in the 4 MB WRT54G v4 flash memory.

Performance Evaluation

First it is shown how AGE reduces the typical authentication delay. Both network and processing latencies are measured at all stages of the authentication process. AGE's performance are compared to that of a typical IEEE 802.1x deployment where the client connects to a powerful authentication server over fast and reliable LAN links, as shown in FIG. 1. We also compare it to that of a direct application of IEEE 802.1x in a GIANT network illustrated in FIG. 2, where the authentication server 40 is reachable over the potentially slow and unreliable Internet.

In comparison, we installed two AGE access points on a campus in Europe and on a campus in the United States, similar to FIG. 3. Table 1 shows the breakdown of authentication costs for each measured deployment, using EAP-TLS over an enterprise LAN and the Internet respectively, and AGE over the Internet cross continents. For EAP-TLS over both LAN and the Internet, a Pentium-4 laptop served as the authentication server. For AGE Freeradius server and WPA supplicant run at the access points. The processing latency for AGE at the access point is significantly higher than that at a Pentium-4 PC because of the access point is equipped with a 200 MHz microcontroller. Overall, AGE cuts the total authentication latency by half, as a result of the savings on the communication over the Internet. Note that 94.3% of the AGE latency actually comes from the processing latency at the access point, which can be easily further reduced by a faster microcontroller. From Table 2 it is clear that the EAP-AGE protocol reduces jitter in authentication times offering more stability for sensitive applications like VoIP.

TABLE 2

| | Average | Minimum | Maximum |
|---|---|---|---|
| EAP-TLS GIANT | 0.998509 | 0.987507 | 2.253010 |
| EAP-AGE GIANT | 0.557370 | 0.497009 | 0.639851 |

TABLE 3

| Zone | Members |
|---|---|
| 1 | 11579 |
| 2 | 8635 |
| 3 | 39127 |
| 4 | 25348 |
| 5 | 420962 |
| 6 | 238867 |
| 7 | 102302 |
| 8 | 96880 |
| 9 | 102333 |
| 10 | 41310 |
| 11 | 12236 |

TABLE 3-continued

| Zone | Members |
|---|---|
| 12 | 71980 |
| 13 | 265402 |
| 14 | 562028 |
| 15 | 730577 |
| 16 | 10318 |
| 17 | 2718 |
| 18 | 131364 |
| 19 | 106329 |
| 20 | 13154 |
| 21 | 47395 |
| 22 | 264036 |

Analysis of Reachability in a Social Network

AGE's ability to correctly authenticate users depends on the success rate of the social network look-up. If the AP is not connected to the target zone then it will not be able to verify the client and will reject a valid client. If there is a path the facing routing algorithm will succeed. To verify that social networks are well connected we analyzed SMS traces from a large nationwide cellular provider. The traces cover the individual SMS messages from over 6 million users covering a 6 month span. In the traces we consider two parties friends if they have exchanged at least one SMS message. This is a loose definition of friend and means that some nodes which are relatively inactive will have unusually low connectivity because they might have only sent or received one or two SMS messages. Cellular networks provide a natural method for dividing users into zones. The processing of SMS messages is handled by mobile switching center (MSC) in a hierarchical fashion so that all messages sent from a group of cell towers in a given area are forwarded to a single MSC. Overall in our trace there are 22 MSCs. The home MSC of any user can be extracted from his telephone number prefix. We assign users to zones per MSC. Using this breakdown we have the zones shown in Table 3. The AGE map of the zones was constructed by finding the GPS coordinates of each MSC.

Figure 5:
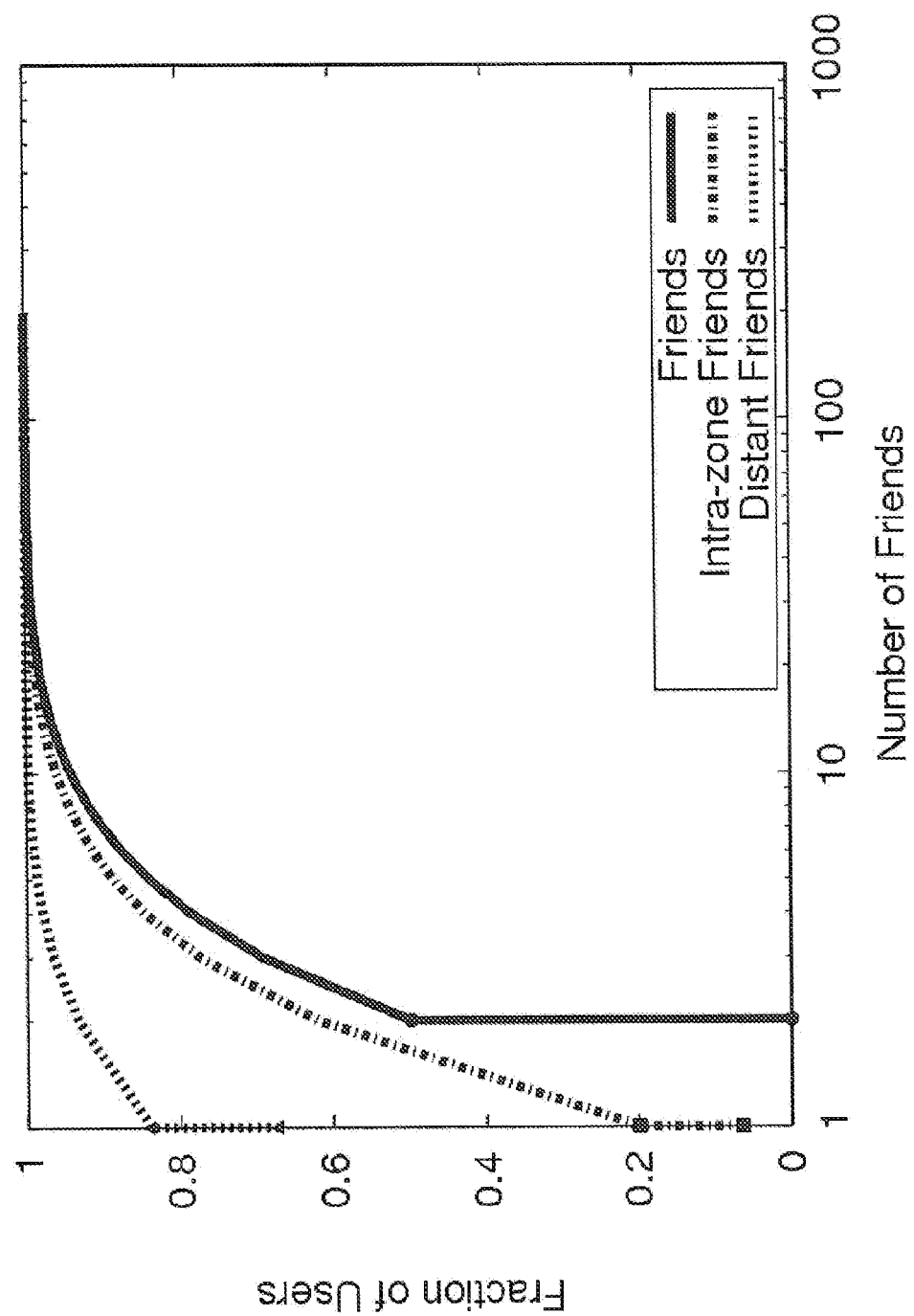
FIG. 5 shows a graph with the total number of friendship access points, the number of intra-zone connections and the number of long distance connections in accordance with an embodiment of the invention.

We first analyzed the friendships of each user. FIG. 5 shows the cumulative distribution function of number of friends, number of intra-zone friends and number of long distance friends. Many of the users have only 1 friend. These users likely do not use SMS regularly. Some users have tens of thousands of friends. These users likely are bots or messaging service from the cellular provider. The mean, min and max number of friends is 2.3, 1, and 46789. If we take out the outlier infrequent users and bots the mean, min and max change to 4.2, 2, and 967 Intra-zone friends are those in different zones. Overall 88% of all users (including one friend users) had a friend in a different zone. To determine if a user has long distance links we made Voronoi diagram of AGE map. If a zone neighbours any other zone in the diagram they are local neighbours. If the zone does not border the user's zone those are long distance links. 27% of users have at least one long distance link.

Figure 6:
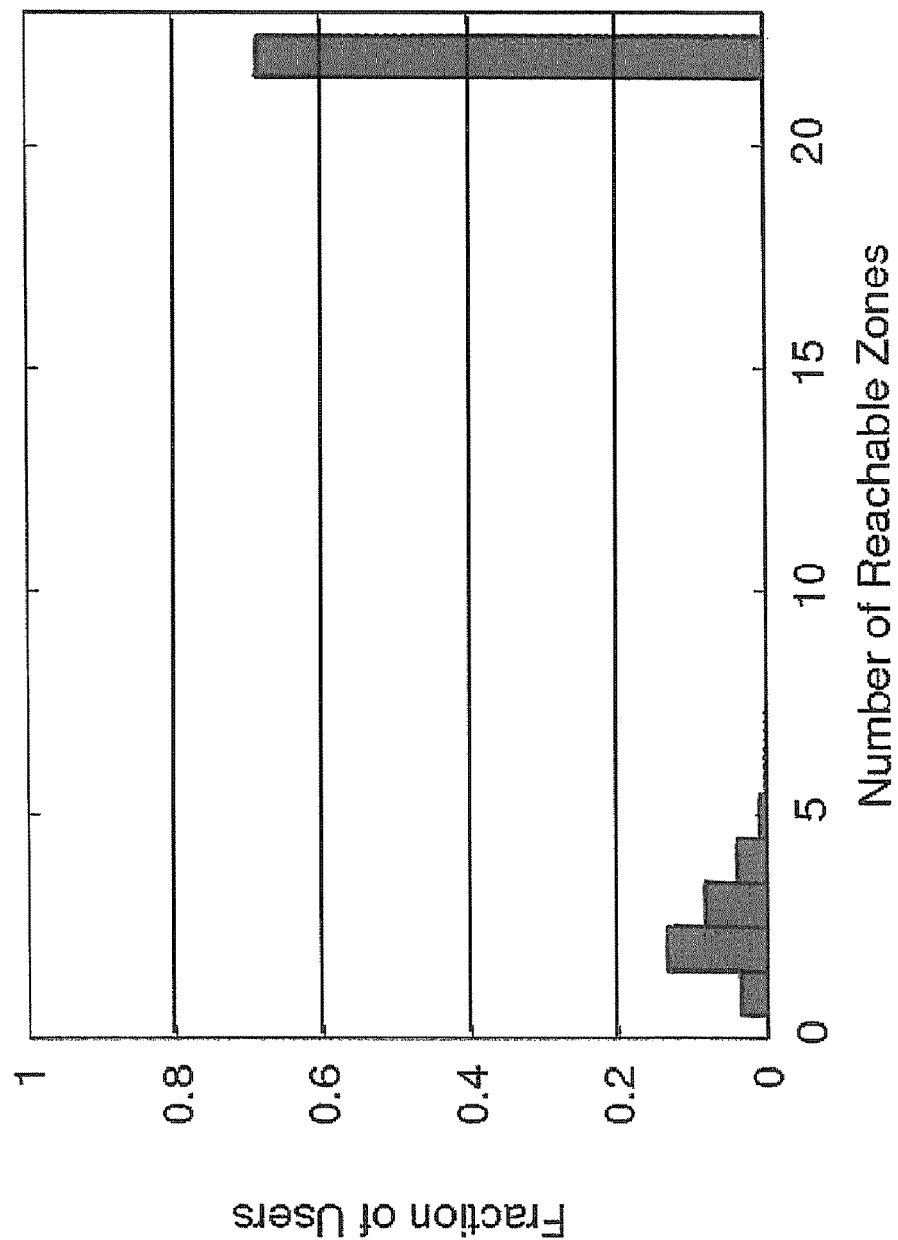
FIG. 6 shows a graph with the maximum number of zones reachable by fractions of the population following only social links in the social graph of SMS users, which was used for the evaluation of reachability in accordance with an embodiment of the invention.

To decide if these connectivity properties could support the social network we evaluated the reachability of every user. We filtered out the outliers as before and traced the friendship graph for each user searching for each zone. FIG. 6 shows how many zones were reachable by users. It is clearly a bimodal distribution. The users in the left hand side of the figure—those with incomplete reachability had on average between 1.71 and 3.17 friends. Those on the right hand side, the well connected users had on average 5.02 friends. The slight increase in friendship links satisfies connectivity and suggests that having at least 5 friends is sufficient to maintain the reachability of the social network.

TABLE 1

|  | EAP-TLS/LAN | EAP-TLS/GIANT | EAP-AGE/GIANT |
|---|---|---|---|
| Client Processing Time | 0.021556 [1.00x] | 0.021171 [0.98x] | 0.028369 [1.32x] |
| Server Processing Time | 0.033561 [1.00x] | 0.013828 [0.41x] | 0.485165 [14.46x] |
| Network Delay | 0.065948 [1.00x] | 0.964469 [14.62x] | 0.007132 [0.11x] |
| Total Auth. Delay | 0.121065 [1.00x] | 0.999468 [8.26x] | 0.520666 [4.30x] |

| Authentication Step | EAP-TLS (LAN) Client | EAP-TLS (LAN) Server | EAP-TLS (GIANT) Client | EAP-TLS (GIANT) Server | AGE (GIANT) Client | AGE (GIANT) Server |
|---|---|---|---|---|---|---|
| Processing Time | | | | | | |
| EAP Identity & Type | 0.00032 | 0.0014755 | 0.0003722 | 0.0007211 | 0.0003611 | 0.0134644 |
| Exchange CRL | * | * | * | * | 0.001948 | 0.025764 |
| Exchange HELLO | 0.002643 | 0.006812 | 0.002554 | 0.003481 | 0.001056 | 0.2578861 |
| Exchange, Verify Certificate | 0.01782 | 0.023437 | 0.017575 | 0.008678 | 0.024341 | 0.169887 |
| Finish and Success | 0.000773 | 0.001837 | 0.00067 | 0.000948 | 0.000663 | 0.018164 |
| 4-way Handshake | 0.00735 | — | 0.007204 | — | 0.009078 | — |
| Total Processing Time | 0.025619 | 0.033561 | 0.024806 | 0.013195 | 0.028361 | 0.4851651 |
| Packet Transfer Time | 0.065948 | — | 0.964469 | — | 0.007132 | — |
| Total Elapsed Time | 0.125127 | — | 1.00247 | — | 0.5145261 | — |

Security Analysis

We assume private keys have not been compromised and the CA is trustworthy. However, any router and client can be compromised and can collaborate to carry out attacks. The AGE verification is based on TLS which is known to be secure. AGE adds a new step in the handshake during which the CRL is exchanged. This step does not change the TLS protocol itself, so TLS remains secure. Because the CRL and certificates are signed and both the client and AP have the CA certificate there is no threat of forgery. The certificate certifies the containing CRL id so the client must present the correct CRL segment.

The private keys are never transferred except during the initial installation of the AGE software. We assume that the software (with embedded private keys) is distributed via some secure means, either from a trusted web server over SSL connections or physically installed by a trusted operator.

The biggest threat to AGE security comes from its social network backend. P2P overlay networks are very untrustworthy, threatened by Sybil attacks, routing misbehaviour, forgery, and man in the middle attacks (see M. Castro et al., Secure Routing for Structured Peer-to-Peer Overlay Networks, SIGOPS Oper. Syst. Rev., pages 299-314, 2002). The design of AGE's social overlay overcomes most of these challenges. The identity of each AGE member can be verified using the member's certificate thus overcoming the Sybil attack. Because the AGE social overlay only stores digitally signed timestamp files which can be verified with the CA public key, there is no threat of forgery of the timestamps. Malicious nodes can drop messages which will cause the current authentication to fail. However, by building the overlay based on social connections to friends, the routing paths are considered more trustworthy and therefore less likely to contain malicious nodes. In addition, timestamp requests can be fulfilled by any member of the target zone, so if one route fails there is likely another route available. A malicious node in the social overlay may also collaborate with a client. The only attack the malicious nodes can perform is to replay old timestamps of a CRL matching the last state in which the client was not revoked. The only way to avoid this attack is to gather multiple timestamp files from different hosts. The newest one is most likely to be the correct version. Because a CRL has an expiration date this attack will only have a limited window of success.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for controlling Internet access of a mobile device using a communication system which includes a plurality of access points connected to the Internet and to a plurality of mobile devices, the method comprising the steps of:
   a) performing a certificate-based authentication between an access point, performing the authentication, and a mobile device seeking access to the Internet, wherein the mobile device is disposed in the coverage area of the access point;
   a1) receiving at the access point a certificate transmitted from the mobile device over a wireless link to the access point, wherein the certificate includes at least a mobile device identifier, a public key of the mobile device or a public key of a user of the mobile device, a timestamp indicating a lifetime of the certificate and a CRL segment identifier identifying a CRL segment of a certificate revocation list (CRL);
   a2) verifying the certificate by the access point;
   a3) determining by the access point, based on the CRL segment identifier, whether the certificate of the mobile device has been revoked prior to expiration of the lifetime, wherein the CRL segment is associated with a physical area of the mobile device and at least a portion of the certificate revocation list is stored at least temporarily at the access point; and
   a4) granting the mobile device access to the Internet if the certificate has been verified successfully in the verifying step and the certificate has not been revoked prior to the expiration of the lifetime;
   b) dividing a physical area into a plurality of geographical zones, each geographical zone represented by a separate CRL segment to define a plurality of groups respectively by the plurality of geographical zones, wherein each group comprises respective ones of said plurality of access points and respective ones of said plurality of mobile devices;
   c) segmenting the CRL into a plurality of CRL segments and associating a unique CRL segment identifier with each CRL segment, wherein each CRL segment represents a separate group of the plurality of groups;
   d) storing for each group the same CRL segment on each access point of the respective group and storing for each group the same CRL segment identifier associated with the respective group on each mobile device of the respective group;
   e) receiving at the access point the CRL segment identifier of the mobile device and determining by the access point, based on the CRL segment identifier received from the mobile device, whether the access point belongs to the same group as the mobile device;
   e1) if the access point and the mobile device are determined in step e) to be in the same group, then basing the determination made at step a3) on the CRL segment stored on the access point; and
   e2) if the access point and the mobile device are determined in step e) to not be in the same group, then requesting, by the access point, the CRL segment represented by the CRL segment identifier received from the mobile device and basing the determination made at step a3) on the requested CRL segment.

2. The method of claim 1, wherein each CRL segment identifier is embedded in the certificate for at least one of the mobile devices and access points of the group represented by the CRL segment of the respective CRL segment identifier.

3. The method of claim 1, wherein step e2) further comprises the step of forwarding the requested CRL segment to the access point from one of an access point which belongs to the group represented by the CRL segment identifier stored on the mobile device, and a central server storing all CRL segments and associated unique CRL segment identifiers.

4. The method of claim 1, further comprising the steps of:
   assigning each CRL segment a CRL segment timestamp indicating at least one of a time of generation and a last update time of the respective CRL segment;
   storing at least one of a newly generated updated CRL segment and a currently updated CRL segment with the respective CRL segment timestamp and the respective CRL segment identifier on a central server and on each access point of the group represented by the respective CRL segment;
   storing on each mobile device of each group the same CRL segment which represents the respective group and the timestamp associated with the respective CRL segment;
   wherein step e2) further comprises the step of:
   i) forwarding from the mobile device to the access point the requested CRL segment and the timestamp associated with the requested CRL segment;
   ii) forwarding from the access point to at least one of the central server, and the group of access points represented by the CRL segment stored on the mobile device a request for a CRL segment reference timestamp;
   iii) forwarding the requested CRL segment reference timestamp to the access point;
   iv) determining, by the access point, whether the CRL segment timestamp received from the mobile device matches the CRL segment reference timestamp, or lies within a predetermined time interval;
   if the received CRL segment timestamp matches the reference timestamp or lies within a predetermined time interval, then basing the determination made at step a3) on the CRL segment received from the mobile device.

5. The method of claim 4 further comprising the steps of:
   determining, by the access point, whether the CRL segment timestamp received from the mobile device is valid;
   if the CRL segment timestamp received from the mobile device is deemed to be valid, then basing the determination made at step a3) on the CRL segment identifier received from the mobile device; and
   if the CRL segment timestamp received from the mobile device is deemed not to be valid, then proceeding with step e2)ii.

6. The method of claim 4, wherein the request for a CRL segment reference timestamp according to step e2)ii) and the requested CRL segment reference timestamp forwarded in step e2)iii) are transmitted over a trusted peer-to-peer network arranged by the access points using information based on a trusted friendship of at least one owner of the access points forming a plurality of groups of friendship access points.

7. The method of claim 6, further comprising the step of storing, at each access point, at least one of user identifiers, a current IP-addresses the friendship access points, a number of intra-zone connections of each friendship access point, the CRL segment identifiers, and a listing of all geographical zones and the coordinates for all of the geographical zones, wherein each CRL segment identifier represents the geographical zone to which the respective friendship access point belongs.

8. The method of claim 7, further comprising the steps of:
centrally storing a listing which assigns for each access point the current IP-address as a user identifier;
retrieving from the centrally stored listing the current IP-address of at least one of the friendship access points of a first access point;
establishing a connection from first friendship access point to the at least one friendship access point using the retrieved current IP-address;
performing a predetermined authentication between the first access point and the friendship access point to establish a trusted connection between the first access point and the friendship access point;
exchanging the number of intra-zone connections and the CRL segment identifier between the first access point and the friendship access point; and
repeating, for each access point, the steps of centrally storing, retrieving, establishing, performing, and exchanging;
wherein each access point only updates the access point's own IP-address on the listing.

9. The method of claim 7, wherein the request for the CRL segment reference timestamp is transmitted from the access point to the geographical zone which is represented by the same CRL segment identifier as stored on the mobile device using a location based routing algorithm, wherein the request is only routed over the access point's friendship access points and the friendship access points of the friendship access points.

10. The method of claim 7, wherein the location-based routing algorithm is a Greedy-Face-Greedy (GFG) algorithm.

11. The method of claim 9, wherein the request is first transmitted from the access point to a friendship access point having more intra-zone connections than other friendship access points, wherein the friendship access point is located in the same geographical zone as the access point.

12. The method of claim 7, further comprising the steps of:
updating a CRL segment in dependence of a predetermined event on a central server;
forwarding the updated CRL segment from the central server to at least one access point of the group represented by the updated CRL segment; and
forwarding the updated CRL segment from the respective access point to the friendship access points which belong to the same group.

13. The method of claim 4, wherein the CRL segment reference timestamp corresponds to the most recent CRL segment timestamp.

14. The method of claim 1, wherein the access points of the communication system are centrally registered and owned by private entities.

15. A non-transitory computer readable medium having stored thereon a plurality of computer executable instructions when executed on an access point causes the access point to perform a method for controlling Internet access of a mobile device according to claim 1.

16. A communication system for controlling Internet access of a mobile device, comprising:
at least one mobile device including:
a storage medium configured to store a certificate including at least a mobile device identifier, a timestamp indicating a lifetime of the certificate and a unique CRL segment identifier identifying a CRL segment of a certificate revocation list (CRL), the CRL segment associated with a physical area of the at least one mobile device;
a transmitting device configured to transmit the certificate via a wireless link;
a first certificate-based authentication module; and
at least one access point connected to the Internet, the at least one access point including:
a second certificate-based authentication module;
a verification device;
a determining device configured to determine, on the basis of the unique CRL segment identifier, whether the certificate has been revoked prior to the expiration of the lifetime;
a storage device configured to store the CRL or a predetermined segment of the CRL at least temporarily; and
an access granting device configured to grant the mobile device access to the Internet if the mobile device's certificate has been verified successfully and the certificate is absent from the certificate revocation list; and
a central server including a central storage medium configured to store:
a plurality of CRL segments each representing a divided portion of the certificate revocation list, wherein a unique CRL segment identifier is associated with each CRL segment; and
a plurality of the geographical zones each representing a divided portion of a physical area, wherein each geographical zone is associated with a separate CRL segment, and wherein each geographical zone comprises a plurality of access points and a plurality of mobile devices;
wherein: the transmitting device is configured to transmit the certificate to the at least one access point;
the verification device is configured to verify the certificate received from the at least one mobile device;
the first certificate-based authentication module and the second certificate-based authentication module are configured to control an authentication between the at least one mobile device and the at least one access point; and
wherein each access point and each mobile device associated with the same geographical zone stores the same CRL segment representing the respective geographical zone, and wherein the CRL segment identifier associated with the CRL segment representing the respective geographical zone is embedded in the certificate stored on each mobile device of the same geographical zone.

17. The communication system of claim 16, wherein each access point further includes: a first determining device configured to determine, based on the CRL segment identifier received from the mobile device, whether the respective access point belongs to the same geographical zone as the mobile device; and a second determining device configured to determine, based on the stored CRL segment, whether the mobile device's certificate has been revoked prior to the expiration of the lifetime.

18. The communication system of claim 17, wherein each access point further includes: a generating device configured to generate a request for the CRL segment which is represented by the CRL segment identifier received from the mobile device; and a third determining device configured to determine, based on the requested CRL segment, whether the mobile device's certificate has been revoked prior to the expiration of the lifetime.

19. The communication system of claim 18, wherein at least one of each access point and the central server is adapted to forward a CRL segment based on a request to a requesting access point.

20. The communication system of claim 16, wherein: the central server is adapted to assign to each CRL segment a CRL segment timestamp indicating at least one of a time of generation and a last update time of the respective CRL segment;

each access point and each mobile device include a respective storage element configured to store at least one of a newly generated and currently updated CRL segment together with a CRL segment timestamp assigned to the respective CRL segment;

each mobile device is adapted to further transmit the stored CRL segment identifier and the associated timestamp to the access point; and each access point is further adapted to forward a request for a CRL segment reference timestamp to at least one of the central server and the geographical zone which includes the access points having stored the requested CRL segment reference timestamp, and further adapted to determine whether the CRL segment timestamp received from the mobile device matches the received CRL segment reference timestamp, or lies within a predetermined time interval.

21. The communication system of claim 16, wherein the access points are configured to a trusted peer-to-peer network forming a plurality of groups of friendship access points.

22. The communication system of claim 21, wherein each access point is configured to store at least one of user identifiers, a current IP-addresses of the plurality of friendship access points, a number of intra-zone connections of each friendship access point, the CRL segment identifiers, each representing the geographical zone which the respective friendship access point belongs to, and a listing of all geographical zones and coordinates.

23. The communication system of claim 22, further comprising a central storage medium configured to store a listing assigning each access point's current IP-address to the respective user identifier; and wherein each access point is further adapted to:

retrieve from the listing the current IP-address of at least one of friendship access points and to establish a connection to the friendship access point using the retrieved IP-address, the certificate-based authentication module of each access point further adapted to perform a predetermined authentication with the friendship access point to establish a trusted connection between the friendship access points;

exchange the number of intra-zone connections and the CRL segment identifier with the friendship access point over the trusted connection, and update only the access point's own IP-address on the listing.

24. The communication system of claim 22, wherein the central server is configured to:

update the CRL segment in dependence of a predetermined event; and forward the updated CRL segment to at least one first access point located in the geographical zone represented by the updated CRL segment; and wherein the at least one first access point is adapted to forward the updated CRL segment to the friendship access points which are located in the same geographical zone.

25. The communication system of claim 16, wherein the access point is a wireless access point.

\* \* \* \* \*